United States Patent
Cherian et al.

(10) Patent No.: US 9,692,698 B2
(45) Date of Patent: Jun. 27, 2017

(54) METHODS AND SYSTEMS TO OFFLOAD OVERLAY NETWORK PACKET ENCAPSULATION TO HARDWARE

(71) Applicant: Nicira, Inc., Palo Alto, CA (US)

(72) Inventors: Shoby Cherian, Dublin, CA (US); Raghavendra Subbarao Narahari Venkata, Santa Clara, CA (US); Tanuja Ingale, Campbell, CA (US)

(73) Assignee: NICIRA, INC., Palo Alto, CA (US)

(*) Notice: Subject to any disclaimer, the term of this patent is extended or adjusted under 35 U.S.C. 154(b) by 52 days.

(21) Appl. No.: 14/320,386

(22) Filed: Jun. 30, 2014

(65) Prior Publication Data
US 2015/0381494 A1    Dec. 31, 2015

(51) Int. Cl.
| H04L 12/28 | (2006.01) |
| H04L 12/741 | (2013.01) |
| H04L 29/06 | (2006.01) |
| H04L 12/931 | (2013.01) |
| H04L 12/46 | (2006.01) |

(Continued)

(52) U.S. Cl.
CPC ........ *H04L 45/745* (2013.01); *G06F 9/45558* (2013.01); *H04L 12/4633* (2013.01); *H04L 49/354* (2013.01); *H04L 69/22* (2013.01); *G06F 2009/45595* (2013.01); *H04L 49/9068* (2013.01); *H04L 61/103* (2013.01); *H04L 61/6022* (2013.01); *H04L 2012/4629* (2013.01)

(58) Field of Classification Search
CPC . H04L 45/745; H04L 12/4633; H04L 49/354; H04L 49/9068; H04L 69/22; H04L 61/103; H04L 61/6022; G06F 9/455

USPC .......................................................... 370/392
See application file for complete search history.

(56) References Cited

U.S. PATENT DOCUMENTS

| 6,219,699 B1 | 4/2001 | McCloghrie et al. |
| 6,496,935 B1 | 12/2002 | Fink et al. |

(Continued)

FOREIGN PATENT DOCUMENTS

WO  PCT/US2014/072878    12/2014
WO  WO 2016/003489    1/2016

OTHER PUBLICATIONS

U.S. Appl. No. 14/320,492, filed Jun. 30, 2014, Cherian, Shoby, et al.

(Continued)

*Primary Examiner* — Peter Cheng
(74) *Attorney, Agent, or Firm* — Adeli LLP

(57) ABSTRACT

A method for offloading packet encapsulation for an overlay network is provided. The method, at a virtualization software of a host, sends a mapping table of the overlay network to a physical network interface controller (NIC) associated with the host. The mapping table maps the identification of each of a set of virtual machine (VM) of a tenant on the host to an identification of a tunnel on the overlay network. The method, at the virtualization software, receives a packet from a VM of the tenant. The method sends the packet to the physical NIC. The method, at the physical NIC, encapsulates the packet for transmission over the overlay network by using the mapping table. The method of claim also tags the packet by the virtualization software as a packet that requires encapsulation for transmission in the overlay network prior to sending the packet to the physical NIC.

20 Claims, 16 Drawing Sheets

(51) Int. Cl.
*G06F 9/455* (2006.01)
*H04L 12/861* (2013.01)
*H04L 29/12* (2006.01)

(56) References Cited

U.S. PATENT DOCUMENTS

| | | | |
|---|---|---|---|
| 7,079,544 B2 | 7/2006 | Wakayama et al. | |
| 7,606,260 B2 | 10/2009 | Oguchi et al. | |
| 8,825,900 B1 | 9/2014 | Gross, IV et al. | |
| 8,856,518 B2 | 10/2014 | Sridharan et al. | |
| 9,008,085 B2 | 4/2015 | Kamble et al. | |
| 9,116,727 B2 | 8/2015 | Benny et al. | |
| 9,135,044 B2 | 9/2015 | Maharana | |
| 9,143,582 B2 | 9/2015 | Banavalikar et al. | |
| 2005/0053079 A1 | 3/2005 | Havala | |
| 2006/0029056 A1 | 2/2006 | Perera et al. | |
| 2006/0206655 A1 | 9/2006 | Chappell et al. | |
| 2008/0267177 A1 | 10/2008 | Johnson et al. | |
| 2009/0161547 A1 | 6/2009 | Riddle et al. | |
| 2010/0165874 A1 | 7/2010 | Brown et al. | |
| 2010/0275199 A1 | 10/2010 | Smith et al. | |
| 2012/0072909 A1* | 3/2012 | Malik | H04L 12/4641 718/1 |
| 2012/0079478 A1 | 3/2012 | Galles et al. | |
| 2012/0163388 A1* | 6/2012 | Goel | H04L 12/4641 370/395.53 |
| 2012/0167082 A1 | 6/2012 | Kumar et al. | |
| 2013/0033993 A1* | 2/2013 | Cardona | H04L 49/70 370/248 |
| 2013/0058346 A1 | 3/2013 | Sridharan et al. | |
| 2013/0311663 A1* | 11/2013 | Kamath | H04L 29/08576 709/227 |
| 2013/0318219 A1 | 11/2013 | Kancherla | |
| 2014/0056151 A1 | 2/2014 | Petrus et al. | |
| 2014/0098815 A1 | 4/2014 | Mishra et al. | |
| 2014/0115578 A1 | 4/2014 | Cooper et al. | |
| 2014/0123211 A1* | 5/2014 | Wanser | H04L 63/10 726/1 |
| 2014/0269712 A1* | 9/2014 | Kidambi | H04L 12/4633 370/392 |
| 2015/0016300 A1 | 1/2015 | Devireddy et al. | |
| 2015/0019748 A1 | 1/2015 | Gross, IV et al. | |
| 2015/0215207 A1 | 7/2015 | Qin et al. | |
| 2015/0381495 A1 | 12/2015 | Cherian et al. | |

OTHER PUBLICATIONS

International Search Report and Written Opinion of PCT/US2014/072878, Apr. 29, 2015 (mailing date), Nicira, Inc.

Anwer, Muhammad Bilal, et al., "Building a Fast, Virtualized Data Plane with Programmable Hardware," Aug. 17, 2009, pp. 1-8, VISA'09, ACM, Barcelona, Spain.

Author Unknown, "Network Functions Virtualisation; Infrastructure Architecture; Architecture of the Hypervisor Domain," Draft ETSI GS NFV-INF 004 V0.3.1, May 28, 2014, pp. 1-50, France.

Koponen, Teemu, et al., "Network Virtualization in Multi-tenant Datacenters," Aug. 2013, pp. 1-22, VMware, Inc., Palo Alto, California, USA.

Le Vasseur, Joshua, et al., "Standardized but Flexible I/O for Self-Virtualizing Devices," Month Unknown, 2008, pp. 1-7.

Pettit, Justin, et al., "Virtual Switching in an Era of Advanced Edges," Sep. 2010, pp. 1-7, USA.

Spalink, Tammo, et al., "Building a Robust Software-Based Router Using Network Processors," Month Unknown, 2001, pp. 216-229, ACM, Banff, Canada.

Turner, Jon, et al., "Supercharging PlanetLab—A High Performance, Multi-Application Overlay Network Platform," SIGCOMM-07, Aug. 27-31, 2007, 12 pages, ACM, Koyoto, Japan.

Portions of prosecution history of U.S. Appl. No. 14/320,492, Apr. 13, 2016, Cherian, Shoby, et al.

Peterson, Larry L., et al., "OS Support for General-Purpose Routers," HOTOS '99 Proceedings of the Seventh Workshop on Hot Topics in Operating Systems, Mar. 1999, 9 pages, Department of Computer Science, Princeton University, Princeton, New Jersey, USA.

\* cited by examiner

| VNI ID | VM MAC Address | VTEP MAC Address | VTEP IP Address |
|---|---|---|---|
| VNI_1 | VM1_MAC_ADD | VTEP1_MAC_ADD | VTEP1_IP_ADD |
| VNI_1 | VM2_MAC_ADD | VTEP1_MAC_ADD | VTEP1_IP_ADD |
| VNI_1 | VM3_MAC_ADD | VTEPm_MAC_ADD | VTEPm_IP_ADD |
| ⋮ | ⋮ | ⋮ | ⋮ |
| VNI_n | VMp_MAC_ADD | VTEP1_MAC_ADD | VTEP1_IP_ADD |
| VNI_n | VMq_MAC_ADD | VTEP2_MAC_ADD | VTEP2_IP_ADD |

*Fig. 3*

| VNI ID | VM MAC Address | VTEP MAC Address | VTEP IP Address | Layer 2 IP multicast Address | Gateway MAC Address | Gateway IP Address |
|---|---|---|---|---|---|---|
| VNI_1 | VM1_MAC_ADD | VTEP1_MAC_ADD | VTEP1_IP_ADD | IP_MCAST_ADD_1 | G_MAC_ADD_1 | G_IP_ADD_1 |
| VNI_1 | VM2_MAC_ADD | VTEP1_MAC_ADD | VTEP1_IP_ADD | IP_MCAST_ADD_1 | G_MAC_ADD_1 | G_IP_ADD_1 |
| VNI_1 | VM3_MAC_ADD | VTEPm_MAC_ADD | VTEPm_IP_ADD | IP_MCAST_ADD_1 | G_MAC_ADD_1 | G_IP_ADD_1 |
| ... | ... | ... | ... | ... | ... | ... |
| VNI_n | VMp_MAC_ADD | VTEP1_MAC_ADD | VTEP1_IP_ADD | IP_MCAST_ADD_n | G_MAC_ADD_n | G_IP_ADD_n |
| VNI_n | VMq_MAC_ADD | VTEP2_MAC_ADD | VTEP2_IP_ADD | IP_MCAST_ADD_n | G_MAC_ADD_n | G_IP_ADD_n |

*Fig. 10*

METHODS AND SYSTEMS TO OFFLOAD OVERLAY NETWORK PACKET ENCAPSULATION TO HARDWARE

BACKGROUND

An overlay network is a network virtualization technology that achieves multi-tenancy in cloud computing environment. Examples of overlay networks include Virtual eXtensible LAN (VXLAN), Generic Network Virtualization Encapsulation (GENEVE), and Network Virtualization using Generic Routing Encapsulation (NVGRE). For instance, VXLAN is an Open Systems Interconnection (OSI) model Layer 2 (L2) overlay scheme over a Layer 3 (L3) network. VXLAN encapsulates an Ethernet L2 frame in IP (MAC-in-UDP encapsulation) and allows Virtual Machines (VM) to be a part of virtualized L2 subnets operating in separate physical L3 networks. Similarly, NVGRE uses Generic Routing Encapsulation (GRE) to tunnel L2 packets over L3 networks.

Today, the encapsulation of an overlay network L2 frame originating from a VM is handled in software. This involves significant work on the part of the overlay network software to maintain and lookup overlay network address mapping tables, and to encapsulate a transmit packet with an outer header that includes relevant overlay network, UDP, IP and Ethernet information before it is sent out on the wire. Similarly the reverse process of decapsulation of the outer header for a received packet is also the responsibility of the software. Each mapping table lookup and encapsulation/decapsulation of packet in software incurs significant CPU cost and affects performance.

Peripheral Component Interconnect Express (PCIe) is a high-speed serial computer expansion bus standard. Single Root I/O Virtualization (SR-IOV) is an I/O virtualization technology that allows a PCIe device to appear as multiple separate physical PCIe devices.

The virtualization software (sometime referred to as a hypervisor) of some host machines support SR-IOV enabled network adapters. The instantiated VFs can be configured such that they are assigned directly to VMs and the guest operating system's driver takes possession of the VFs. While such configuration delivers near native network performance to the VM, the data path bypasses hypervisor/network stack. Hence such VMs cannot be fully utilized in an overlay network based multi-tenant environment.

BRIEF SUMMARY

Some embodiments provide a method for offloading overlay network packet encapsulation and decapsulation to hardware. A host that participates in overlay network includes an overlay network virtualization software that covers the configuration/control plane, data plane and overlay network packet processing functionality. The host acts as a tunnel end point. There is a unique identifier associated with each overlay network. For a VXLAN overlay network, the tunnel end point is known as Virtual Tunnel Endpoint (VTEP) and the unique identifier is referred to as the VXLAN Network Identifier (VNI).

The overlay network software is responsible for maintaining an overlay network mapping table to include VM media access control (MAC) address to the tunnel end point IP and other address mappings. These tables are looked up by the virtualization software while performing packet encapsulation and decapsulation on an overlay network packet during its travel from a VM to virtual network and vice versa. Some embodiments provide a copy of the overlay network mapping table to an overlay network offload capable physical network interface controller (NIC). Packets that require an overlay network encapsulation are tagged by the overlay network virtualization software.

When an overlay network offload capable NIC receives such a tagged packet in the transmit (egress) path, the NIC encapsulates the packet using the mapping table before transmitting the packet to the network. On the receive (ingress) path, the NIC decapsulates an overlay network packet by stripping the outer overlay network layers before passing the packet to the host virtualization software.

SR-IOV is a specification that allows a single PCIe physical device under a single root port to appear to be multiple separate physical devices to the hypervisor or the guest operating system. SR-IOV uses physical functions (PFs) and virtual functions (VFs) to manage global functions for the SR-IOV devices. The instantiated VFs can be configured such that they are assigned directly to VMs and the guest operating system's driver takes possession of the VFs causing the overlay network data path (e.g., VXLAN data path) to be bypassed in the virtualization software/network stack. An overlay network offload capable NIC is able to overcome this limitation.

Once the overlay network mapping table is shared with the overlay network capable NIC, the NIC is able to form proper association between each VM, VF, and the physical NIC by using the overlay network mapping table. This will enable the NIC to correctly encapsulate (for transmit) and de-capsulate (for receive) all overlay network packets.

For SR-IOV VF's, the egress packets are received directly from the VMs at the NIC. The VMs do not tag the packets to indicate the packets require an overlay network encapsulation. Since there is no tag associated with the packets that arrive at the NIC through the VFs, all packets received at the NIC through a VF are encapsulated in the NIC using the mapping table if the VF is configured in the overlay network segment. On the other hand, the packets that are sent by VMs through the PF are tagged by the overlay network software in the hypervisor to indicate that the hypervisor requires NIC to perform the encapsulation on the given packet before the NIC sends out on the wire.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 3 illustrates a VXLAN address mapping table in some embodiments of the invention.

FIG. 10 illustrates a VXLAN address mapping table in some embodiments of the invention.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Virtualization is the ability to simulate a hardware platform, such as a server, storage device or network resource, in software. A virtual machine (VM) is a software implementation of a machine such as a computer. Virtual networks are abstractions of a physical network. VMs may communicate using virtual networks. One such virtual network is an overlay network, which is a Layer 2 overlay scheme over a Layer 3 network. Examples of this type of overlay network are VXLAN, NVGRE, and GENEVE. For brevity, the rest of this specification uses the example of VXLAN as an overlay network that is a Layer 2 overlay scheme over a Layer 3 network. A person of ordinary skill in the art will realize that the invention can be readily applied to other overlay networks (which, e.g., may use other encapsulation protocols) without deviating from the teachings of the invention.

VXLAN uses MAC Address-in-User Datagram Protocol (MAC-in-UDP) encapsulation to extend Layer 2 segments across a data center network. The MAC-in-UDP adds a VXLAN header to the original payload (i.e., the Layer 2 frame) and encapsulates them in a UDP-IP packet. The MAC-in-UDP encapsulation is then used to tunnel Layer 2 network over Layer 3 network.

As a part of the VXLAN configuration, a virtual tunnel endpoint (VTEP) is configured on every host. The VTEPs are used to map tenants' end devices to VXLAN segments and to perform VXLAN encapsulation and decapsulation. Each VXLAN network is assigned a unique identifier referred to as virtual network identifier (VNI). Each host VTEP is assigned a unique IP address. The VTEP uses this IP address to encapsulate Ethernet frames and transmit the encapsulated packets to the transport network through the IP interface.

Figure 1:
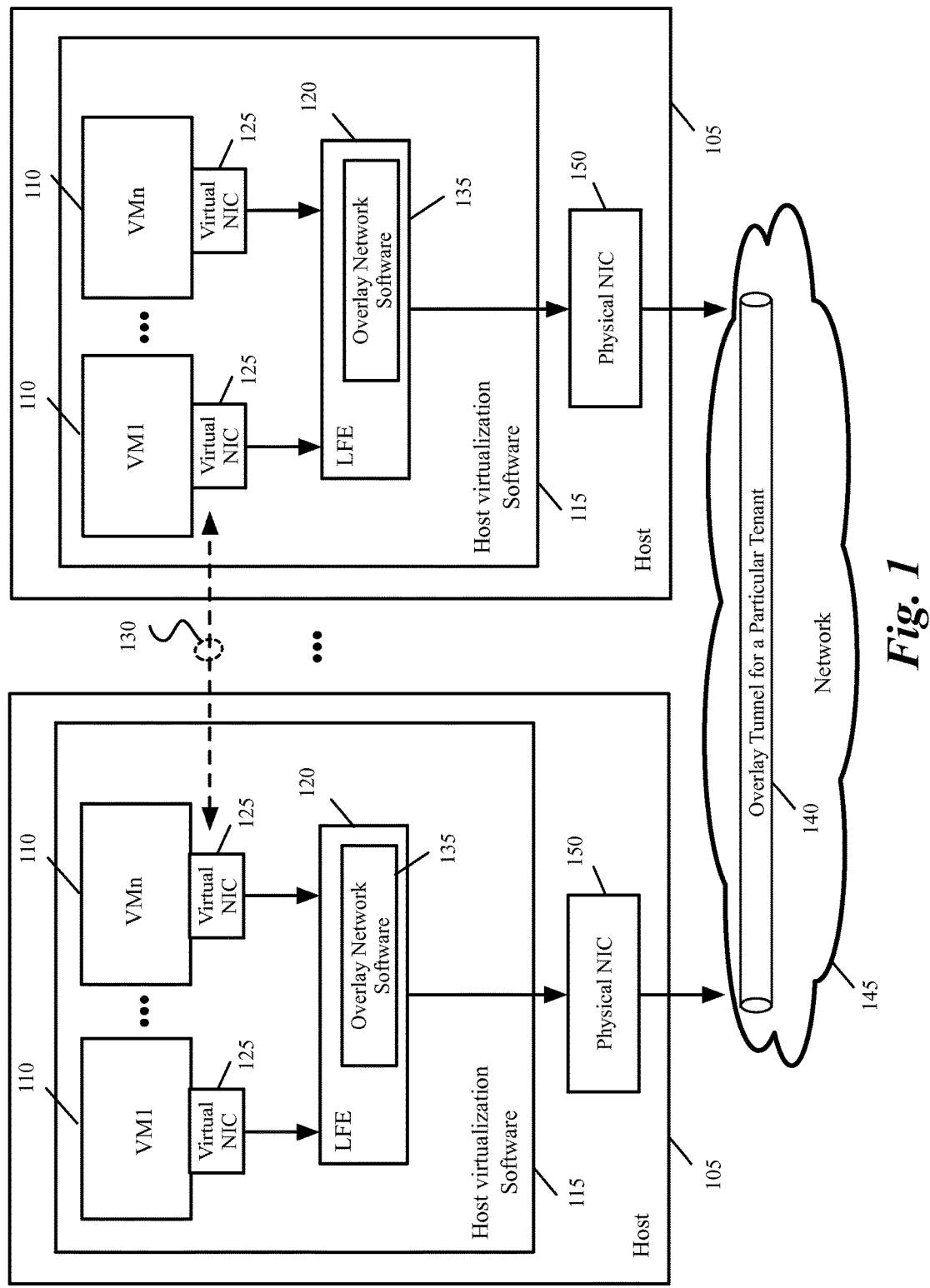
FIG. 1 conceptually illustrates a portion of a virtual infrastructure that includes VXLAN in some embodiments of the invention.

FIG. 1 conceptually illustrates a portion of a virtual infrastructure that includes an overlay network in some embodiments of the invention. As shown, several virtual machines (VMs) 105 are hosted by several host virtualization software 110-115.

The virtualized infrastructure in some embodiments is managed by a single cloud management system. The term cloud service refers to services (such as computing, storage, etc.) provided in a distributed manner over a network. The virtualized infrastructure includes a set of host machines 105 hosting multiple tenants. Each tenant has one or more VMs. For simplicity, FIG. 1 only shows VMs 110 for one tenant.

Each host 105 includes a host virtualization software 115 (sometimes referred to as a hypervisor). The host virtualization software 115 shown in this figure are representative of the various types of virtualization software (e.g., virtual machine monitor, etc.) that may operate on hosts in such a virtualized infrastructure.

In some embodiments, the virtualization software includes a physical forwarding element (PFE) such as a virtual switch. In the virtualization field, some refer to software switches as virtual switches as these are software elements. However, in this specification, the software forwarding elements are referred to as physical forwarding elements (PFEs), in order to distinguish them from logical forwarding elements (LFEs), which are logical constructs that are not tied to the physical world. In other words, the software forwarding elements are referred to as PFEs because they exist and operate in the physical world, whereas LFEs are a logical representation of a forwarding element that is presented to a user when designing a logical network. In some embodiments, several PFEs are distributed throughout the network implement tenant's LFEs, where each PFE is a local instantiation of an LFE that operate across different host machines and can perform L3 packet forwarding between VMs on the host machine or on different host machines. An LFE is sometimes referred to as a virtual distributed switch (VDS).

In each host 105, the LFE 120 connects to a physical network interface card 125 to send outgoing packets and to receive incoming packets. In some embodiments, an LFE is defined to include a port (not shown) through which it connects to the physical NIC 150 to send and receive packets. Each LFE is also defined to have several virtual ports (not shown) to connect to tenant VMs.

As shown, each VM 110 includes a virtual NIC 125. In some embodiments, each virtual NIC in a VM is responsible for exchanging packets between the VM and the network virtualization layer of the host virtualization software 115 through an associated virtual NIC emulator. Each virtual NIC emulator interacts with NIC drivers in the VMs to send and receive data to and from the VMs. In some embodiments, the virtual NIC are software abstractions of physical NICs implemented by virtual NIC emulators. For instance, the code for requesting and obtaining a connection ID resides in components of virtual NIC emulators in some embodiments. In other words, the virtual NIC state is implemented and maintained by each virtual NIC emulator in some embodiments. Virtual devices such as virtual NICs are software abstractions that are convenient to discuss as though part of VMs, but are actually implemented by virtualization software using emulators. The state of each VM, however, includes the state of its virtual devices, which is controlled and maintained by the underlying virtualization software.

The VMs 110 of a tenant form a logical network (also referred to as private network or virtual network), which is conceptually shown by the dashed line 130. The logical network is an abstraction of a physical network and may provide a virtual Layer 2 (or data link layer) for services such as encapsulation and decapsulation of network layer data packets into frames, frame synchronization, medial access control, etc. The logical network may span one or more physical networks and be organized independent of the underlying physical topology and organization of the physical networks. The logical network is identified by a logical network identifier (also known as virtual network identifier or VNI). Each logical network is configured by a tenant.

A host that participates in overlay network includes overlay network virtualization software that covers the configuration/control plane, data plane and overlay network packet processing functionality. The host includes (e.g., as a part of the LFE software) the overlay network virtualization software 135 that acts as a tunnel end point. In the example of VXLAN overlay network, the overlay network virtualization software is referred to as VXLAN Virtual Tunnel Endpoint (VTEP) software and the tunnel end point is known as VTEP. There is a unique identifier associated with each instance of an overlay network. The unique identifier associated with each VXLAN network is referred to as the VXLAN Network Identifier (VNI). The overlay network software 135 is responsible for maintaining a mapping table to include, e.g., VM MAC to tunnel end point address and other address mappings. The overlay network traffic between a tenant's VMs 110 that are hosted on separate hosts 105 is passed through a tunnel 140 through the communication network 145. The communication network 140 may include the Internet, local area networks (LANs), wide area networks (WANs), different hardware equipment such as cables, routers, switches, etc.

As described further below, the physical NICs 150 in some embodiments are capable (e.g., through the NIC's hardware, firmware, and/or software) of offloading encapsulation and decapsulation of overlay network packets from the host virtualization software. The virtualization software determines (e.g., based on the virtual port configuration) whether a transmit packet requires overlay network encapsulation. For instance, overlay network encapsulation is required when the packet has to traverse the virtual network from one host to another. In some embodiments, a transmit packet that requires overlay network encapsulation is tagged by the virtualization software and forwarded to the physical NIC for overlay network encapsulation.

Similarly, when an overlay network encapsulated packet is received at the NIC, the NIC decapsulates the packet by stripping the outer encapsulation layer (e.g., the VXLAN encapsulation) of the packet before forwarding the packet to the virtualization software. An overlay network encapsulation offload capable NIC receives a copy of the overlay network mapping table from the virtualization software. The mapping table provides the mapping between each VM's address (e.g., VM's MAC address) and overlay network identifier (e.g., VXLAN VNI) and tunnel end point address (e.g., VTEP MAC and IP addresses).

Figure 2:
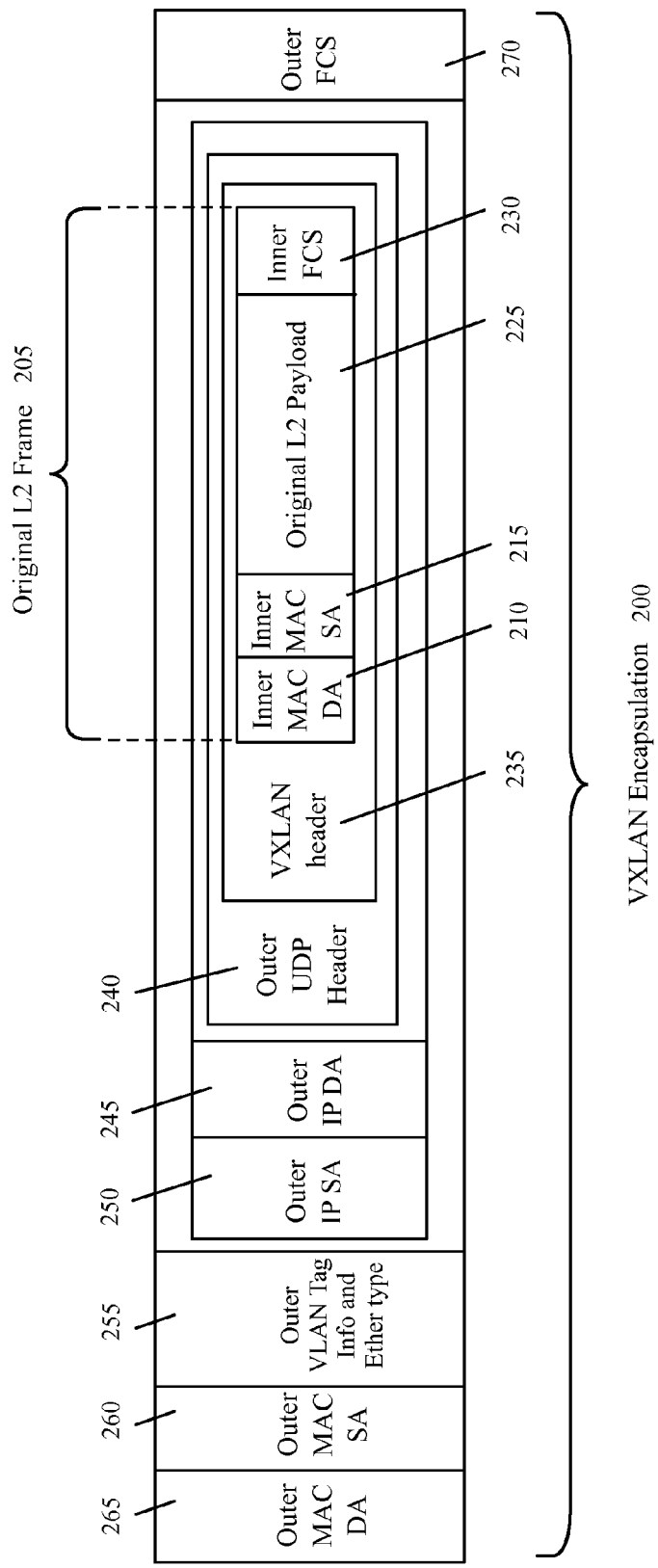
FIG. 2 conceptually illustrates a simplified diagram for VXLAN encapsulation.

FIG. 2 conceptually illustrates a simplified diagram for VXLAN encapsulation 200. As shown, the original L2 packet (e.g., an original Ethernet frame) 205 includes a destination MAC address 210 (referred to as inner destination MAC address), a source MAC address 215 (referred to as inner source MAC address), and a payload 225 (e.g., an original Ethernet payload). The original L2 frame 205 can also include a frame check sequence (FCS) 230 such as checksum or cyclic redundancy check (CRC). The original L2 packet 205 is herein referred to as the inner packet.

The original Ethernet frame 205 is wrapped in a VXLAN header 235 (which includes the VXLAN VID). This inner frame is further wrapped in a UDP header 240 (referred to as outer UDP). The result is further wrapped in outer IP header (which includes outer IP destination 245 and source 250 addresses). The result is further wrapped in outer MAC header (which includes outer virtual local area network (VLAN) tag information and Ether type 255 and the Ethernet header that includes the outer source MAC address 260, and outer destination MAC address 265). Finally, the VXLAN encapsulation includes an optional outer FCS 270. By doing the outer wrapping, VXLAN creates a logical network for VMs across different networks. VXLAN (and other similar overlay networks) creates a Layer 2 network on top of Layer 3 networks. The fields 235-265 and the optional outer FCS 270 are herein referred to as the outer header and the encapsulated packet 200 is referred to as the outer packet.

FIG. 2 is a simplified diagram that shows a selected number of fields for VXLAN encapsulation. Further details describing additional fields for VXLAN encapsulation is described in "VXLAN: A Framework for Overlaying Virtualized Layer 2 Networks over Layer 3 Networks", by M. Mahalingam, et al., Network Working Group, Aug. 26, 2011, which is incorporated herein by reference. Although this document refers to this selected fields for simplicity, a person of ordinary skill in the art will realize that encapsulating packets for VXLAN or other overlay networks require encapsulating the packets with the entire outer header. A person of ordinary skill in the art will also realize that the inner packet 205 can have additional fields that are not shown in FIG. 2.

In FIG. 2, the outer wrap is used to deliver the L2 payload through an L3 network. For instance, the outer source IP source address is the IP address of the source VTEP and the outer destination IP address is the IP address of the destination VTEP. The outer source MAC address is the MAC address of the source VTEP and the outer destination MAC address is the MAC address of the next network entity (such as a router of gateway) on the path from the source VTEP to the destination VTEP.

In some embodiments, the VTEP includes the following components: A VM kernel component that is part of the LFE and is used for VXLAN data path processing, which includes maintenance of forwarding tables; a VM kernel NIC virtual adapter to carry VXLAN traffic, and a VXLAN port group that dictates how VXLAN traffic is carried in and out of the host VTEP through the physical NICs.

I. Offloading VXLAN Packet Encapsulation to Hardware

Some embodiments provide methods and systems for offloading encapsulation and decapsulation of VXLAN headers to network interface controllers (also known as network adapters, network interface cards or NICs). These embodiments improve the performance and latency of VXLAN implementation by avoiding spending CPU cycles in software for performing VXLAN address table lookups and for encapsulating/decapsulating each outgoing or incoming packet. The VXLAN control path and data path are modified in order to offload the encapsulation and de-capsulation of the header to hardware.

A. Programming NIC with VXLAN Address Mapping Table

The control path changes in some embodiments include programming the VXLAN offload aware NICs with VXLAN address mapping tables based on a table maintained in the host virtualization software. Copying the mapping tables to a NIC enables the NIC to generate outer encapsulation header on its own by referencing the mapping table stored in the NIC.

FIG. 3 illustrates a VXLAN address mapping table 300 in some embodiments of the invention. The VXLAN software maintained address mapping table 300 in some embodiments includes the following information (or tuple): VM MAC 305, VXLAN VNI identifier (ID) 310, VTEP MAC address 315, and VTEP IP address 320. The VXLAN software in some embodiments updates (through configuration or learning) the mapping table for the VMs on any host that is configured to use VXLAN.

In some embodiments, one VXLAN VNI ID 305 is associated to each tenant that is using the VXLAN (i.e., each tenant has a unique VNI ID which is e.g., associated to a particular port group on the LFE). In the example of FIG. 3, VNI_1 325 is the VNI ID associated to one tenant (e.g., Tenant 1) and VNI_n 330 is the VNI ID associated with another tenant (e.g., Tenant n). The VTEP MAC address 315 and VTEP IP address 320 identify the virtual tunnel endpoint.

Figure 4:
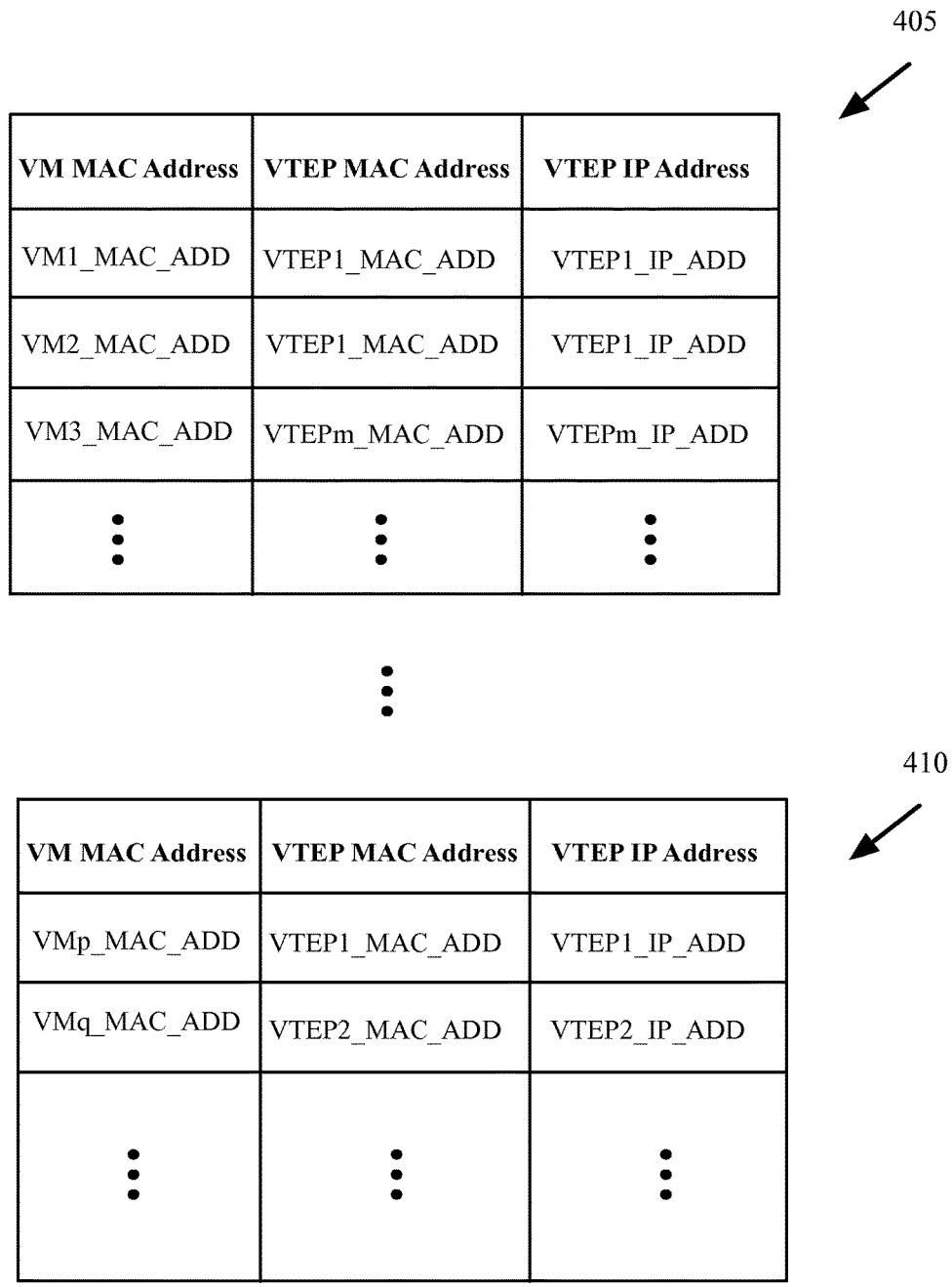
FIG. 4 illustrates several VXLAN address mapping tables that are maintained per VNI ID in some embodiments of the invention.

Some embodiments (as shown in FIG. 3) maintain one mapping table that includes the VNI IDs for all tenants. The mapping table is pushed to the NIC after each event that modifies the mapping table by the host software. Other embodiments maintain one mapping table per VNI ID. These embodiments push each individual mapping table to the NIC after the mapping table is modified by the host software. FIG. 4 illustrates several VXLAN address mapping tables 405-410 that are maintained per VNI ID in some embodiments of the invention. Tables 405-410 in the example of FIG. 4 include similar information as the single table 300 in FIG. 3 except that the tables in FIG. 4 do not include VNI ID. Instead, table 405 includes VXLAN mapping information for VNI_1 325 and table 410 includes VXLAN mapping information for VNI_n 330.

Different embodiments push the address mapping tables to the NIC differently. Some embodiments push the entire table to the NIC whenever the table is updated in the virtualization software. Other embodiments push only one table entry at a time when an entry is added, modified or deleted.

Figure 5:
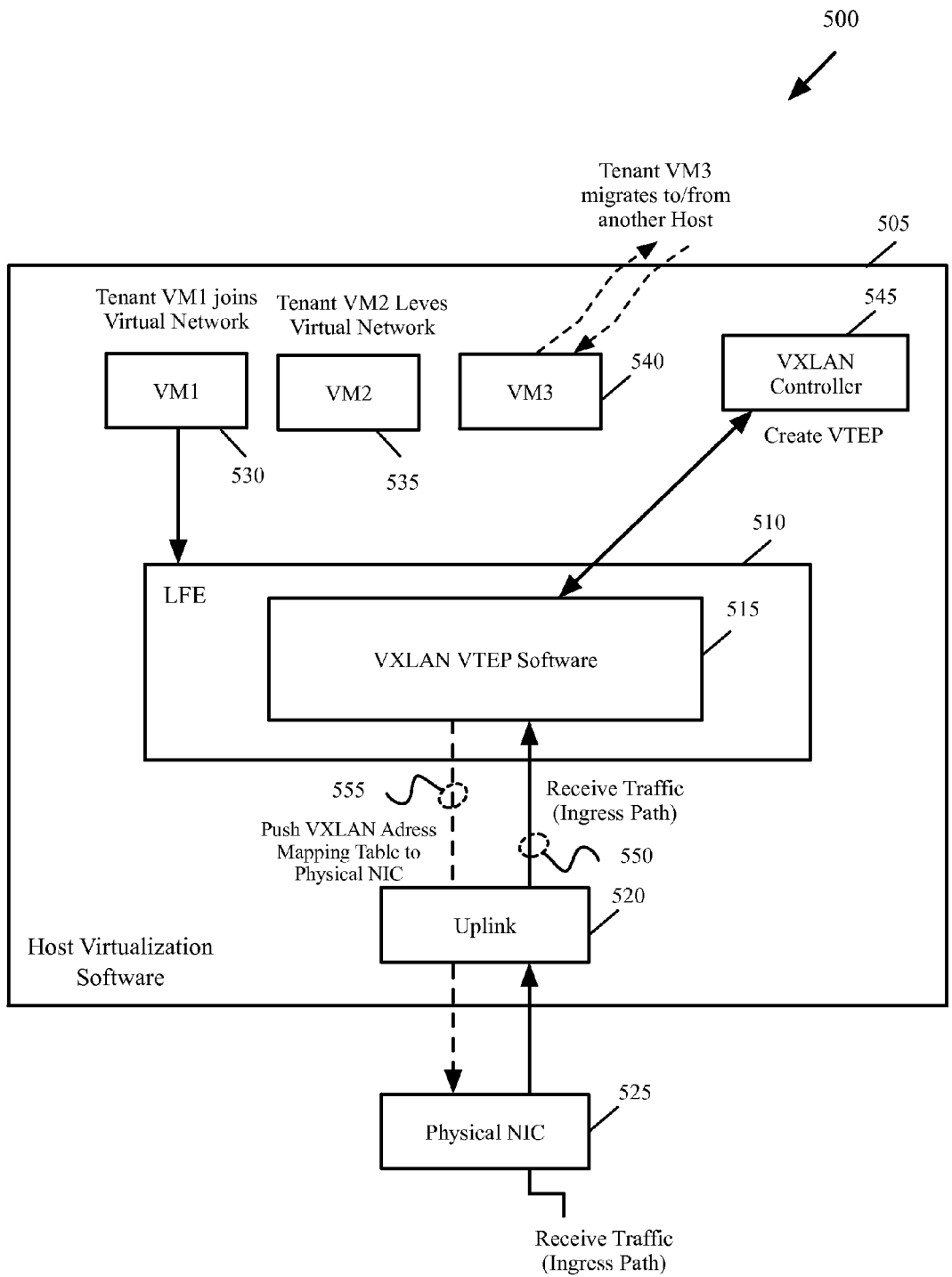
FIG. 5 conceptually illustrates VXLAN control flow that results in updating of VXLAN address mapping table in some embodiments of the invention.

FIG. 5 conceptually illustrates VXLAN control flow that results in updating of VXLAN address mapping table in some embodiments of the invention. As shown, the host virtualization software (sometimes referred to as a hypervisor) 505 includes a virtual switch 510 (e.g., an LFE). The figure illustrates several control events that trigger copying the VXLAN mapping table into the physical NIC 525.

The control events include creation of VTEP 515 by VXLAN controller 545. The control events also include a tenant VM such as VM1 530 joining the virtual network, a tenant VM such as VM2 535 leaving the virtual network, a tenant VM such as VM3 540 migrating to/from another host from/to the host 505. The control events further include receiving traffic on the ingress path 550. As shown in FIG. 5, once any of the above mentioned control events occurs, the VXLAN address mapping table is pushed from the host 505 into the physical NIC 525 as shown by the dashed line 555. Although FIG. 5 shows only one physical NIC, some embodiments utilize multiple physical NICs. The NICs can be bounded (or teamed) together to provide more bandwidth or can be assigned to different virtual switches for traffic isolation.

Figure 6:
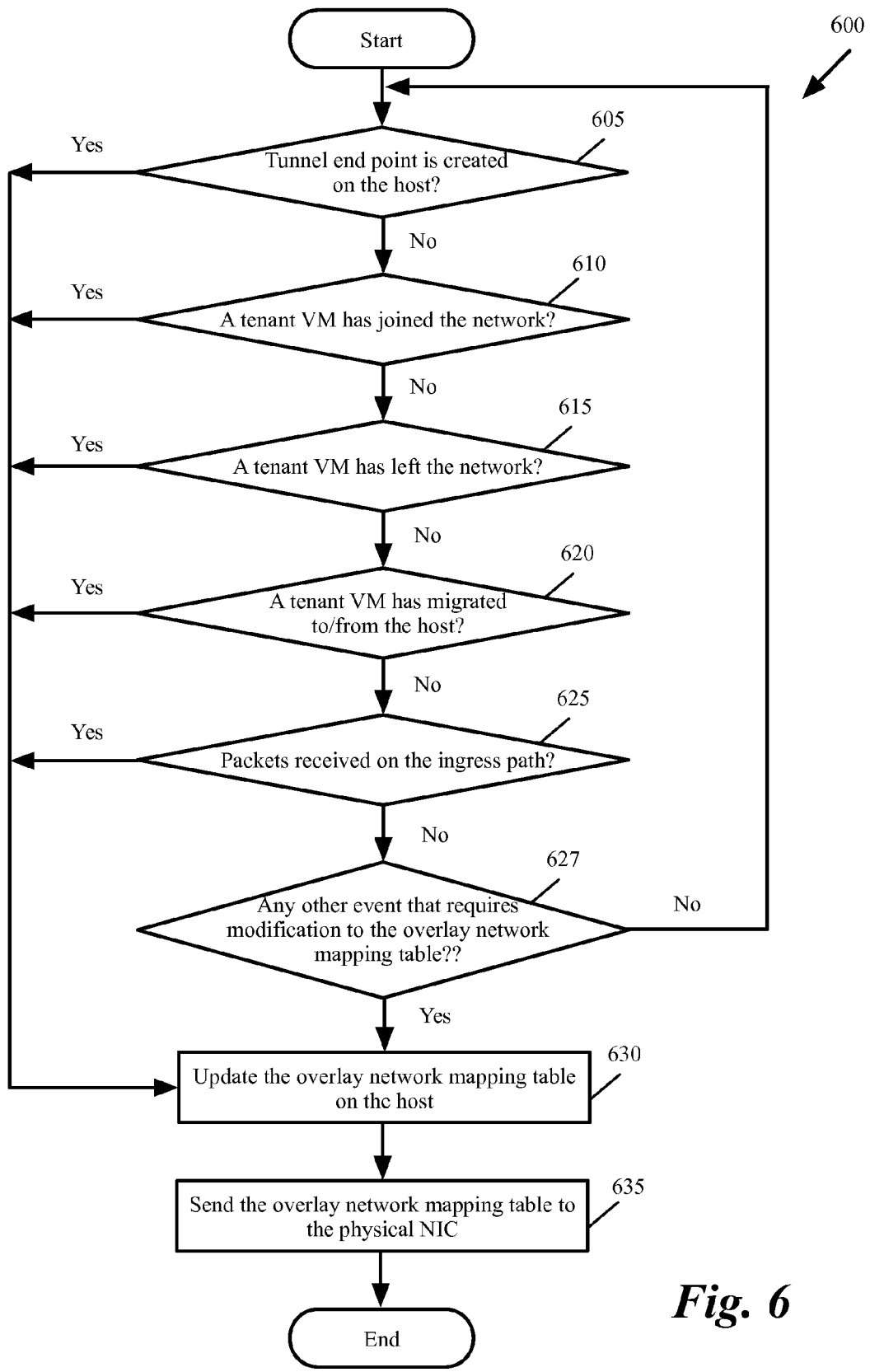
FIG. 6 conceptually illustrates a process for updating the VXLAN address mapping table of a physical NIC in some embodiments of the invention.

FIG. 6 conceptually illustrates a process 600 for updating the VXLAN address mapping table of a physical NIC in some embodiments of the invention. Process 600 is performed in some embodiments by the overlay network software resided in the host virtualization software. As shown, the process determines (at 605) whether a tunnel end point (e.g., a VXLAN VTEP) is created for the host. In some embodiments, the VTEP is configured on a host as a part of the VXLAN configuration process. If yes, the process proceeds to 630, which is described below.

Otherwise, the process determines (at 610) whether a tenant VM (such as VM1 530 in FIG. 5) has joined the network. For instance, a tenant VM may be created and is joined the network. If yes, the process proceeds to 630, which is described below. Otherwise, the process determines (at 615) whether a tenant VM (such as tenant VM2 535 in FIG. 5) has left the network. For instance, a tenant may be removed from the network for security reasons. If yes, the process proceeds to 630, which is described below. Otherwise, the process determines (at 620) whether a tenant VM (such as VM3 in FIG. 5) has migrated to/from the host. For instance, a tenant VM can migrate to/from a host to balance the load on the hosts or a VM can migrate from a failed host to another host.

If yes, the process proceeds to 630, which is described below. Otherwise, the process determines (at 625) whether packets are received on the ingress path. If yes, the process proceeds to 630, which is described below. Otherwise, the process determines (at 627) whether any other event has occurred (e.g., an ARP request from a new source is received at the virtualization software) that causes modification to the mapping table. If not, the process proceeds (e.g., after a predetermined wait) to 605, which was described above. Otherwise, the process updates (at 630) the overlay network address mapping table maintained by the software on the host. The process then sends (at 635) the updated mapping table to the physical NIC. For instance, the process invokes a callback function provided by the overlay network offload enable NIC to push the updated table to the NIC. The process then ends.

In some embodiments a NIC registers its VXLAN capability with the VXLAN software. For instance, a native device driver model in some embodiments allows a NIC device driver to register its VXLAN capability and provide relevant callbacks during initialization. A callback is a function that is passed to another function as a parameter. In an exemplary embodiment, a new callback is added to the registration data of the driver (e.g., a callback named vxlanMappingTableUpdate). The driver provides a function handle for this callback during registration. The VXLAN software invokes this callback to push down VXLAN table updates (e.g., the whole table or only one or more entries of a table) to the NIC.

In addition to the VXLAN address mapping table, gateway details are programmed into the VXLAN offload aware NIC. The gateway details include IP and MAC addresses of the NAT gateway in the event that the destination VTEP is outside of the source VTEP network and routing is required. When the destination VTEP IP is not in the source VTEP network, the destination VTEP IP is still the destination IP, but the outer destination MAC would be the gateway connected to the source VTEP network. The virtualization software provides the NIC the netmask (a mask used to divide an IP address into subnets and specify the networks available hosts) of the source VTEP IP in the egress path for the PF packets. Details of several more callback functions are provided further below.

Furthermore, in order to facilitate broadcast traffic within VXLAN segment, some embodiments program the IP multicast addresses for each VNI ID and MAC multicast into the NIC. IP multicast is a protocol used to simultaneously deliver information to multiple destinations. Multicast sources send single copies of information over the network and let the network take the responsibility for replicating and forwarding the information to multiple recipients. An IP multicast address is a Layer 3 IP address. In order to receive IP multicast packets, the NIC must be programmed to accept traffic destined to the multicast MAC address that correspond to a given multicast IP address.

B. Modifications to Data Path

In order to offload encapsulation and de-capsulation of VXLAN headers to hardware, some embodiments make changes to transmit (egress) and receive (ingress) paths of VXLAN traffic.

1. Modifications to Transmit Data Path

When an outgoing transmit VXLAN packet arrives from a VM into the VXLAN software, the VXLAN software tags the packet for Encapsulation. The VXLAN software supplies the VNI in the packet attribute field so that the NIC knows which virtual network the packet has arrived on. The expensive steps of performing a VXLAN table lookup and encapsulation of the packet (which are offloaded to the physical NIC) are skipped by the VXLAN software.

The rest of the operations on the outgoing packet in the VXLAN software for example, tagging the packet for checksum offload or TCP segmentation offload (TSO) remain unchanged. Once the packet reaches the physical NIC, the NIC first looks for the encapsulation tag. If the tag is set to TRUE, the NIC performs a lookup of the hardware VXLAN address mapping table that was programmed in the control path. The lookup will be based on (Inner destination MAC and VNI to retrieve the corresponding destination VTEP IP and VTEP MAC.

The NIC validates if the destination VTEP IP address is on the same network as source VTEP IP address. If the destination VTEP IP address is not in the same source VTEP network, then in some embodiments the NIC encapsulates the packet with gateway's MAC address as the outer destination MAC address (instead of using a mapping table entry). In other embodiments, the virtualization software updates the address mapping table with the gateway MAC address for the VTEP that is not in the source VTEP network and pushes the updated table to the NIC. In these embodiments, the NIC does not need to do anything as the NIC picks up the VTEP MAC address, which is already changed to gateway's MAC address in the mapping table. Once this lookup is successful, the NIC will encapsulate the inner packet with the newly constructed outer IP header (VTEP IP, VTEP MAC) and carry out rest of the operations such as hardware checksum and TSO and transmit the packet on the wire.

If NIC lookup fails for the inner MAC address in the mapping table, NIC can generate an event to the hypervisor indicating the lookup failure condition for the inner MAC address using the PF driver. This can be achieved by the PF driver calling hypervisor event notification function.

Once this lookup is successful, the NIC encapsulates the inner packet with the newly constructed outer IP header (VTEP IP, VTEP MAC) and carries out the rest of the operations such as hardware checksum and TSO and transmits the packet on the wire.

Figure 7:
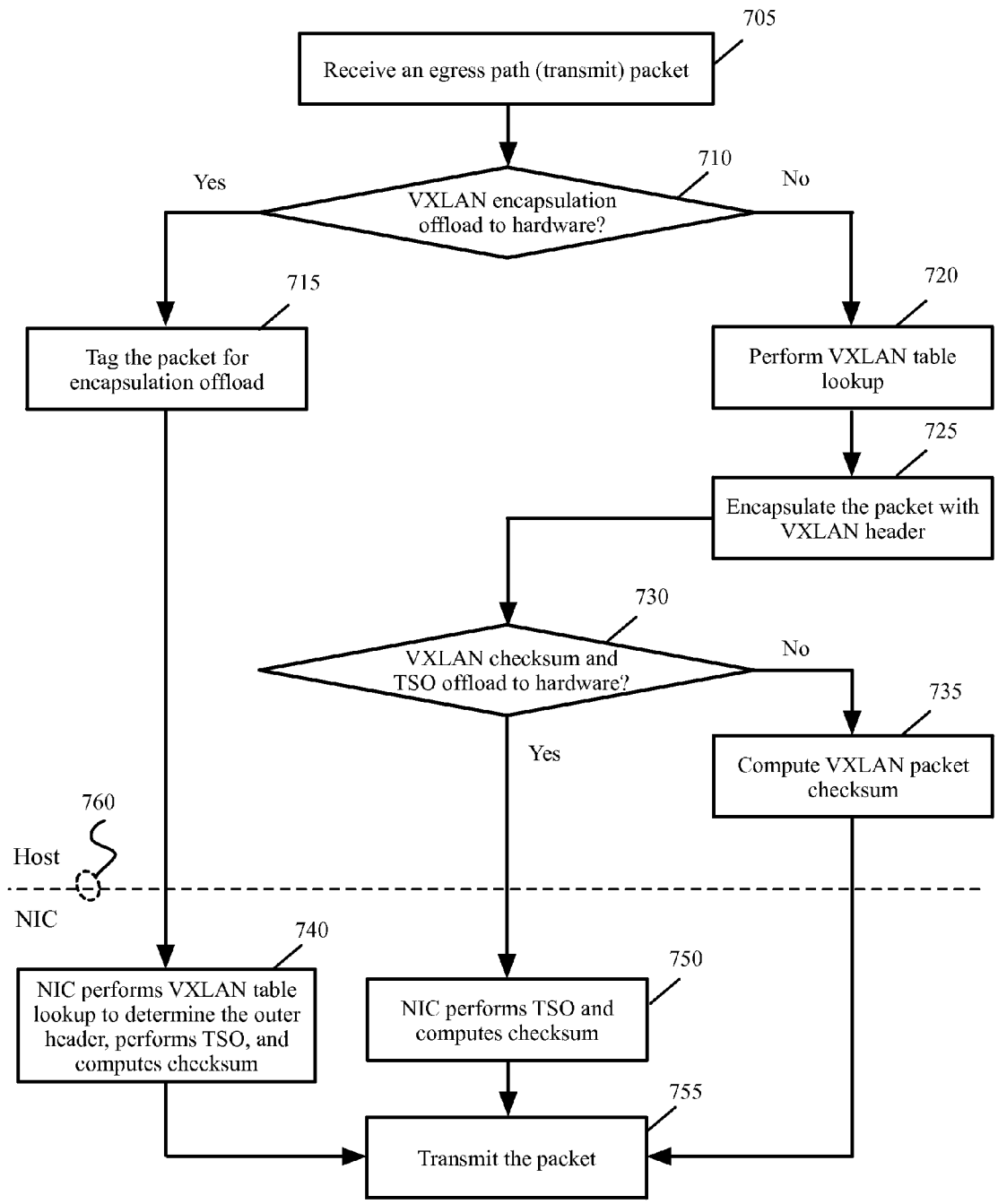
FIG. 7 conceptually illustrates the changes in the egress traffic flow (the transmit path) to offload VXLAN packet decapsulation to hardware in some embodiments of the invention.

FIG. 7 conceptually illustrates the changes in the egress traffic flow (the transmit path) to offload VXLAN packet decapsulation to hardware in some embodiments of the invention. The operations shown above the dotted line 760 are performed by the host software while the operations shown below the line 760 are performed by the physical NIC (i.e., by hardware, firmware, and/or software of the physical NIC).

As shown, the VXLAN software receives (at 705) a packet on the egress path. The VXLAN software then determines (at 710) whether VXLAN encapsulation can be offloaded to the physical NIC. For instance, the process determines whether the packet is transmitted through a VXLAN offload aware NIC. If yes, the packet is tagged (at 715) for encapsulation offload. The packet is then sent for process by the physical NIC as described below.

If VXLAN encapsulation is not offloaded to the NIC, the VXLAN software performs (at 720) VXLAN table lookup. The VXLAN software then encapsulates the packet with the VXLAN header. The software then determines (at 730) whether checksum and/or TSO calculation can be offloaded to hardware. If yes, the packet is forwarded to NIC to perform TSO and compute checksum. Otherwise, the VXLAN software computes (at 735) VXLAN packet checksum. The VXLAN software then forwards the packet to NIC to transmit.

On the hardware side, once a packet is tagged for encapsulation offload, the NIC encapsulates the packet. The NIC (using hardware/firmware and/or software) performs VXLAN table lookup (at 740) to determine the outer header, performs (at 740) TSO, and computes (at 740) checksum with the encapsulated header. The order in which the NIC performs encapsulation, TSO, and checksum calculation is implementation dependent. The NIC then transmits (at 755) the packet (that is encapsulated by the NIC) to the destination.

Also, when the packet is sent to NIC (after operation 730) to do TSO and checksum calculation (e.g., when the NIC is capable of TSO and checksum calculation but not encapsulation), the NIC performs (at 750) TSO and computes checksum. The NIC then transmits (at 755) the packet (which was encapsulated by the host software) to the destination.

The NIC in some embodiments is configured to have access to information for all fields required for encapsulating a packet for transmission over an overlay network. For instance, the NIC in some embodiments constructs the UDP header (item 240 in FIG. 2) by using the source port. The NIC further calculates the UDP length based on the encapsulated packet. Although the encapsulation is described by reference to the example of VXLAN, a person of ordinary skill in the art will realize that the encapsulation can be done over other overlay networks such as GENEVE, etc.

2. Modifications to Receive Data Path

When an incoming packet arrives on the wire at the NIC, the VXLAN offload capable NIC first checks whether it is a VXLAN packet. If yes, the NIC will decapsulate the packet to remove the outer VXLAN header. The NIC tags the packet to indicate that the packet was decapsulated, and saves the VNI, source VTEP IP and VLAN ID from the decapsulated header, in the packet attribute fields before passing it onto the software stack.

VTEP in the host in some embodiments learns any changes to the current mapping table (e.g., VNI, source VTEP MAC, source VTEP IP, inner source MAC) and updates the table in the VXLAN offload aware NIC.

Figure 8:
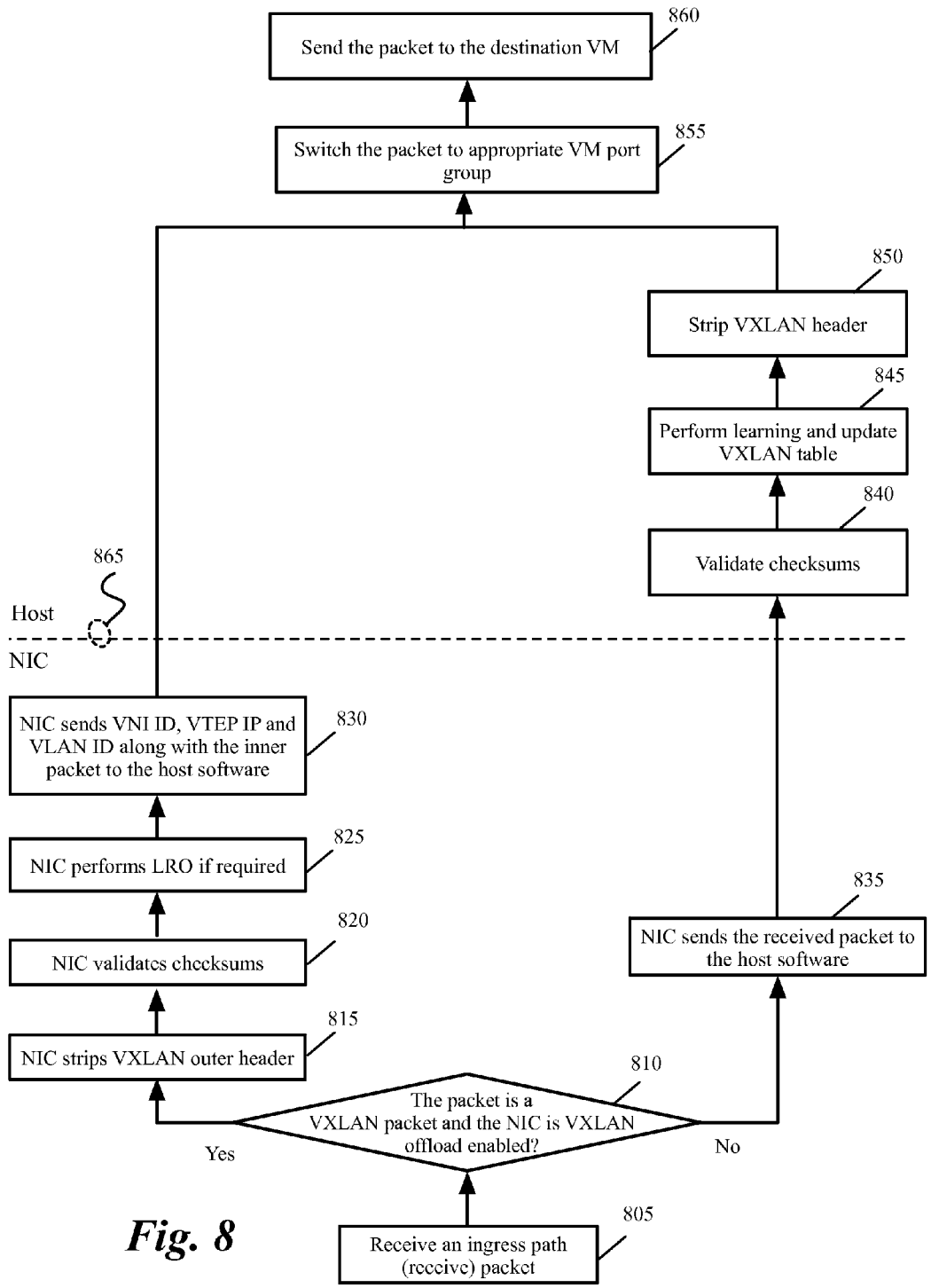
FIG. 8 conceptually illustrates the changes in the ingress traffic flow (the receive path) to offload VXLAN packet decapsulation to hardware in some embodiments of the invention.

FIG. 8 conceptually illustrates the changes in the ingress traffic flow (the receive path) to offload VXLAN packet decapsulation to hardware in some embodiments of the invention. The operations shown above the dotted line 865 are performed by the host software while the operations shown below the line 865 are performed by the physical NIC (i.e., by hardware, firmware, and/or software of the physical NIC). As shown, the physical NIC receives (at 805) a packet in the ingress (receive) data path. The NIC determines (at 810) whether the packet is a VXLAN packet and the NIC is VXLAN offload enabled. If not, the NIC sends (at 835) the packet to VXLAN software for further processing as described below.

If the NIC is VXLAN offload enabled, the NIC strips (at 815) the VXLAN outer header (e.g., items 240-270 in FIG. 2) of the packet. The NIC validates (at 820) the inner checksum (e.g., item 230 in FIG. 2) and the outer checksum, if any (e.g., item 270 in FIG. 2). The NIC in some embodiments is configured to also perform (at 825) large receive offload (LRO). The LRO aggregates multiple incoming packets from a single stream into a larger buffer before the buffer content is passed higher up the networking stack and thereby reducing the packet processing overhead. The NIC then sends (at 830) the inner packet (e.g., item 205 in FIG. 2) along with the outer header information (e.g., the source VNI ID, VTEP IP and MAC addresses, and VLAN ID) to the host software (e.g., the NIC sends the this information to the NIC driver in the host, which in turn sends the information to the VXLAN software). The VXLAN software uses the outer header information as well as the inner packet information (e.g., the source VM MAC) to perform learning and determine, e.g., whether a new VM is created or a VM has moved from one VTEP to another and update the VXLAN address mapping table accordingly. The VXLAN software learns which VM MAC address in the inner packet is associated with which VTEP. Once the mapping table is updated, the VXLAN software uses the callback function (which is provided by the NIC when the NIC has registered its VXLAN offload capability) to push the updated VXLAN mapping table to the NIC hardware.

If the NIC is not VXLAN offload enabled, the VXLAN software validates (at 840) the packet checksums. The VXLAN software then performs learning (at 845) and updates VXLAN table. For instance, when a VM moves from one host to another host, the VXLAN software associates the inner source MAC address (i.e., the source VM MAC address to the source VTEP MAC and the source VTEP IP. The VXLAN header is the stripped (at 850) from the packet.

The host switches (at 855) the packet to appropriate VM port group using the inner destination MAC address. Some embodiments provide port groups as templates for creating virtual ports with particular sets of specifications. Port groups make it possible to specify that a given virtual machine should have a particular type of connectivity on every host on which it might run. The port groups are user-named objects that contain enough configuration information to provide persistent and consistent network access for virtual NICs. When a VM has to be connected to a particular kind of port, a port group with an appropriate definition is used to connect the VM. The VXLAN software identifies the appropriate port group based on the destination MAC address provided in the packet. The host then sends (at 860) the packet to the destination VM.

II. Providing Support for Multi-Tenancy in SR-IOV Enabled NICs

Single Root I/O Virtualization (SR-IOV) is a specification that allows a single Peripheral Component Interconnect Express (PCIe) physical device under a single root port to appear to be multiple separate physical devices to the virtualization software or the guest operating system. SR-IOV uses physical functions (PFs) and virtual functions (VFs) to manage global functions for the SR-IOV devices.

PFs are full PCIe functions that include the SR-IOV extended capability, which is used to configure and manage the SR-IOV functionality. It is possible to configure or control PCIe devices using PFs, and the PF has full ability to move data in and out of the device. VFs are lightweight PCIe functions that contain all the resources necessary for data movement but have a minimized set of configuration resources. SR-IOV enabled PCIe devices present multiple instances of themselves to the guest operating system instance and the host virtualization software.

The instantiated VFs can be configured such that they are directly assigned to VMs and the guest operating system's driver takes possession of the VF. For instance, each VF can create a direct path from a VM to the physical NIC. While such configuration delivers near native network performance to the VM, the data path bypasses the virtualization software/network stack (i.e., the VFs are pass-through devices). Hence such VFs in those VMs are unable to benefit from an overlay network based multi-tenant environment.

Once VXLAN address mapping table is shared with VXLAN capable NIC (as described in Section I, above), it will enable the NICs to overcome the limitation of bypassing of the data path described above by intelligently forming proper association between VM, VF, and the physical NIC using the VXLAN address mapping table. This will enable the NIC to correctly encapsulate (for transmit) and de-capsulate (for receive) all VXLAN packets.

A. SR-IOV Flow

SR-IOV capable NIC hardware exposes physical function (PF) and several virtual functions (VF) to the operating system during PCIe bus scan. In some embodiments, VFs can be configured as pass-through PCIe devices for VM consumption. Once a particular VF is assigned to a VM, the driver within the VM takes control of the VF PCIe device. In the prior art implementation of SR-IOV, VMs with pass-through devices cannot be part of VXLAN domain as the traffic bypasses the virtualization software and hence the VM is not enabled to run in a multi-tenant environment. As described below, some embodiments provide a method to have multi-tenancy solution for the VFs that are assigned to the VMs. The method includes modifications to control path, transmit data path, and receive data path.

1. Modifications to Control Path

The VFs are available as PCIe pass-through devices in the virtualization software in some embodiments. A PCIe VF device can be assigned to a VM. In the VM configuration, the PCIe VF device can be linked to an LFE port group (like any other network adaptor). At the time of the VM power on, a port on the LFE's port group is reserved to associate with the VF device. This port is marked on the LFE as a pass-through port. The VF does not use the assigned port as a data path since the VF provides a direct connection between the VM and the NIC and bypasses the virtualization software. Instead, the port assigned to the VF is used for control operations such as MAC address change, MTU change, assigning a VLAN ID to the VF, etc.

As described below, the PF driver registers several pass-through operations for its associated VFs with VXLAN software. The MAC, maximum total size (MTU), and VLAN properties of a VF are set using these pass-through operation callbacks. These pass-through operations are done using the PF driver in the virtualization software.

Figure 9:
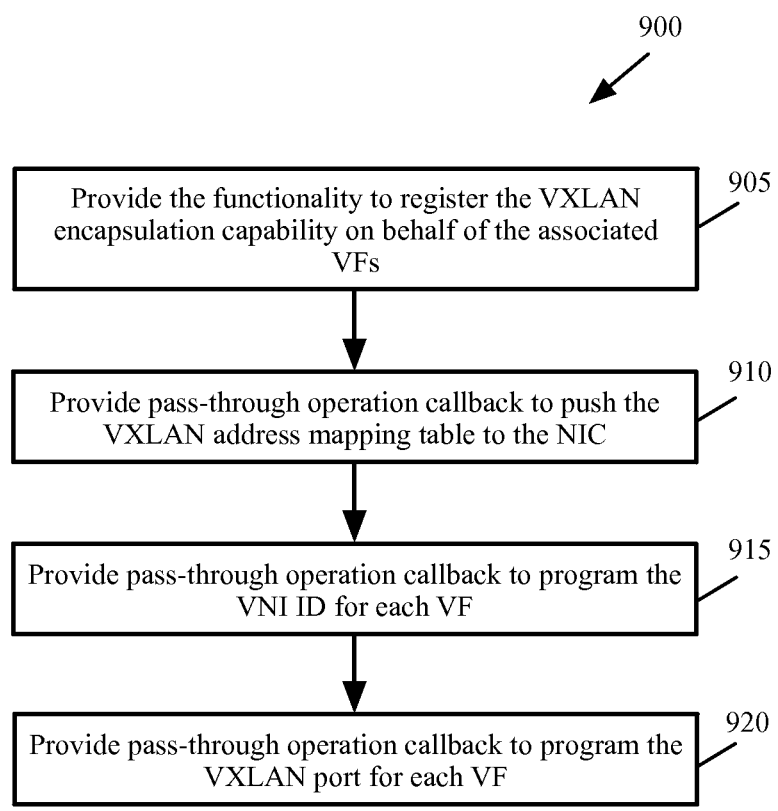
FIG. 9 conceptually illustrates several functionalities provided by a PF driver to support multi-tenancy for SR-IOV in some embodiments of the invention.

Some embodiments provide several modifications to the control path in order to provide support for multi-tenancy in the SR-IOV enabled NICs. FIG. 9 conceptually illustrates several functionalities 900 that are provided by a PF driver (which resides in the virtualization software) to support multi-tenancy for SR-IOV in some embodiments of the invention. As shown, the PF driver provides (at 905) the functionality to register the VXLAN encapsulation offload capability on behalf of its associated VFs with the virtualization software. The PF driver also provides several callback functions at the time of registration for use by the VXLAN software. The PF driver provides (at 910) pass-through operation callback for the VXLAN software to push the VXLAN address mapping table updates (e.g., the whole table or only one or more entries of a table) to the NIC. FIG. 10 illustrates a VXLAN address mapping table 1000 in some embodiments of the invention. As described in Section I above, the information in the VXLAN address mapping table 1000 includes mappings of inner VM MAC address 310 to the VTEP IP address 315 and VTEP MAC address 320 for each VNI-ID 305 that is configured on the LFE. The virtualization software sets the source VTEP IP address, source VTEP netmask for the VF in addition to setting the VNI ID. The virtualization software in some embodiments pushes the table entries required for the VNI ID that is configured on the VF only.

As shown, the mappings in table 1000 also include one ore more IP multicast address 1005 for Layer 2 broadcast and multicast (one IP address 1005 is shown in FIG. 10). A multicast address is a logical identifier for a group (or a subset) of destinations in a network that are intended to receive multicast packets. The table 1000 also includes gateway IP address 1010 and gateway MAC address 1015 for a gateway that is assigned to each VNI ID. The gateway, in some embodiments is a network address translation (NAT) gateway to provide connection to destinations outside the domain of the VNI ID.

Figure 11:
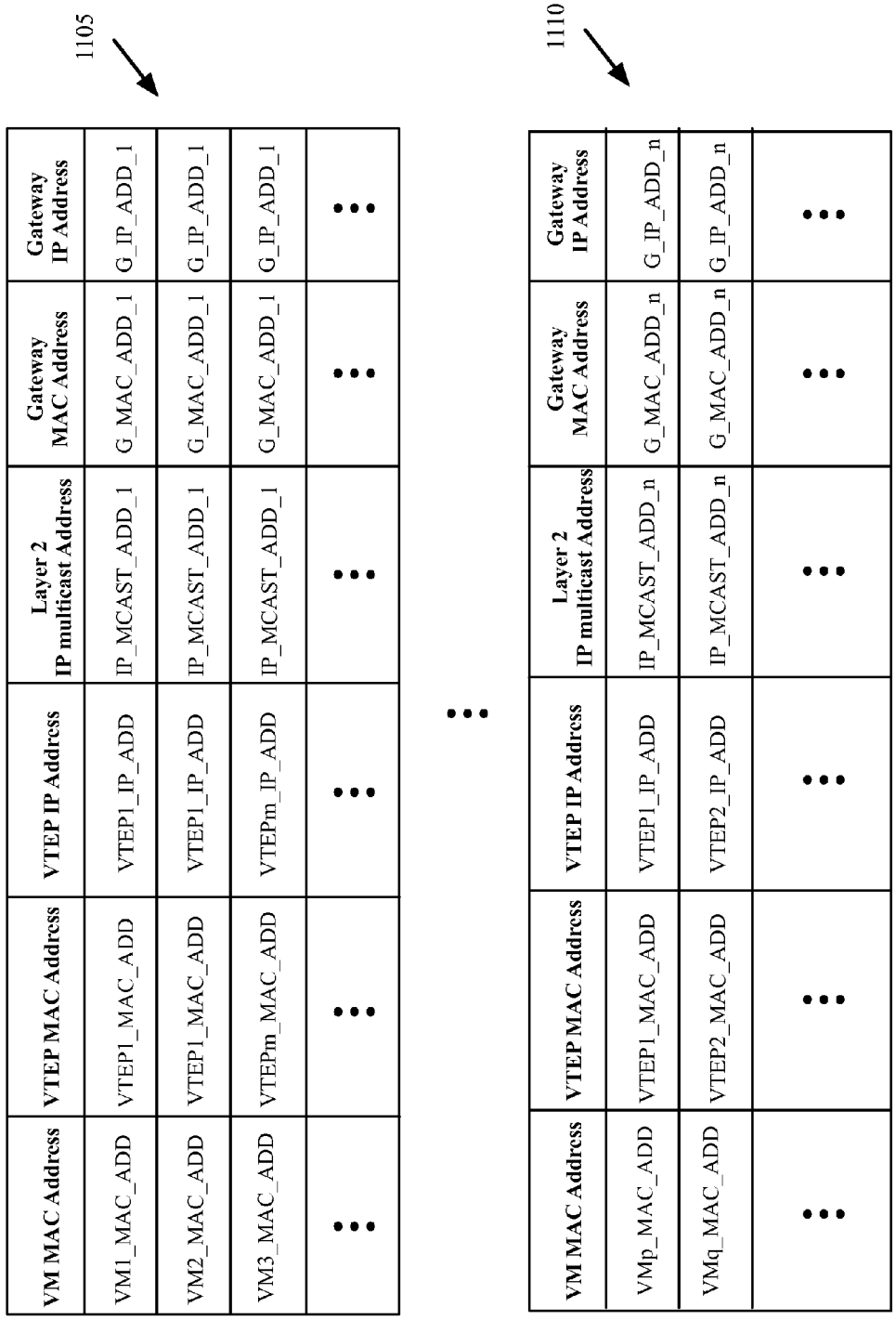
FIG. 11 illustrates several VXLAN address mapping tables that are maintained per VNI ID in some embodiments of the invention.

Furthermore, some embodiments maintain a separate VXLAN address mapping table for each VNI ID. FIG. 11 illustrates several VXLAN address mapping tables 1105-1110 that are maintained per VNI ID in some embodiments of the invention. Tables 1105-1110 in the example of FIG. 11 include similar information as the single table 1000 in FIG. 10 except that the tables in FIG. 11 do not include VNI ID. Instead, table 1105 includes VXLAN mapping information for VNI_1 1025 and table 1110 includes VXLAN mapping information for VNI_n 1030.

FIGS. 10 and 11 show a Layer 2 IP multicast Address (1005) for each table entry. However, in some embodiments, the Layer 2 IP multicast Address is the same for all entries for a given VTEP IP address and VNI ID pair. Accordingly, when a separate mapping table (such as tables 1105-1110) is used for each VNI ID, some embodiments do not include the Layer 2 IP multicast address and the associated gateway IP address in the mapping table. Instead, these embodiments provide determine that when the inner MAC address in a packet is a broadcast or multicast IP address and use the multicast IP and MAC address as the VTEP IP and MAC addressees respectively. In addition, some embodiments provide one mapping table per VF based on the VNI ID of the VF.

Referring back to FIG. 9, the PF driver further provides (at 915) a pass-through operation callback for the VXLAN software to program (i.e., to set) the VNI ID for the VF on the NIC. The PF driver also provides (at 920) pass-through operation callback to program the VXLAN port (i.e., the source UDP port) for the VF. The destination UDP port is a well-defined port (e.g., Internet Assigned Number Authority (IRNA) has assigned the value 4789 for the destination UDP port). The virtualization software updates the VXLAN mapping table and sets the VNI ID for the VF using these pass-through operations. Callbacks described by reference to operations 910-920 are examples of the callbacks provided by the NIC in some embodiments of the invention. Other embodiments provide additional pass-through operation callbacks (e.g., to set MAC address, MTU, VLAN properties, etc., on a VF).

FIG. 9 described examples of several functionalities and callbacks provided by a PF driver in some embodiments of the invention. Other embodiments provide additional and/or other mechanisms. For instance, some embodiments provide a mechanism to set or update each entry in the address mapping table. Some of these embodiments utilize the same callback function (with different parameters) to set or update each table entry. Other embodiments provide different callbacks for different entries.

In addition to the VXLAN address mapping table, gateway details are programmed into the VXLAN offload aware NIC in some embodiments. The gateway details include IP and MAC addresses of the NAT gateway in the event that the destination VTEP is outside of the source VTEP network and routing is required. When the destination VTEP IP is not in the source VTEP network, the destination VTEP IP is still the destination IP, but the outer destination MAC would be the gateway connected to the source VTEP network. The virtualization software provides the NIC the netmask of the source VTEP IP in the egress path for the PF packets. For a VF, the virtualization software sets the source VTEP IP, netmask, VNI ID, and source UDP port during power on of VM in the control path using the PF pass-through callback operations to configure the VF. Similar method can be used to update other overlay networks such as GENEVE optional headers to the NIC. Furthermore, the above-mentioned functionalities can be provided in one or in multiple callback functions.

Figure 12:
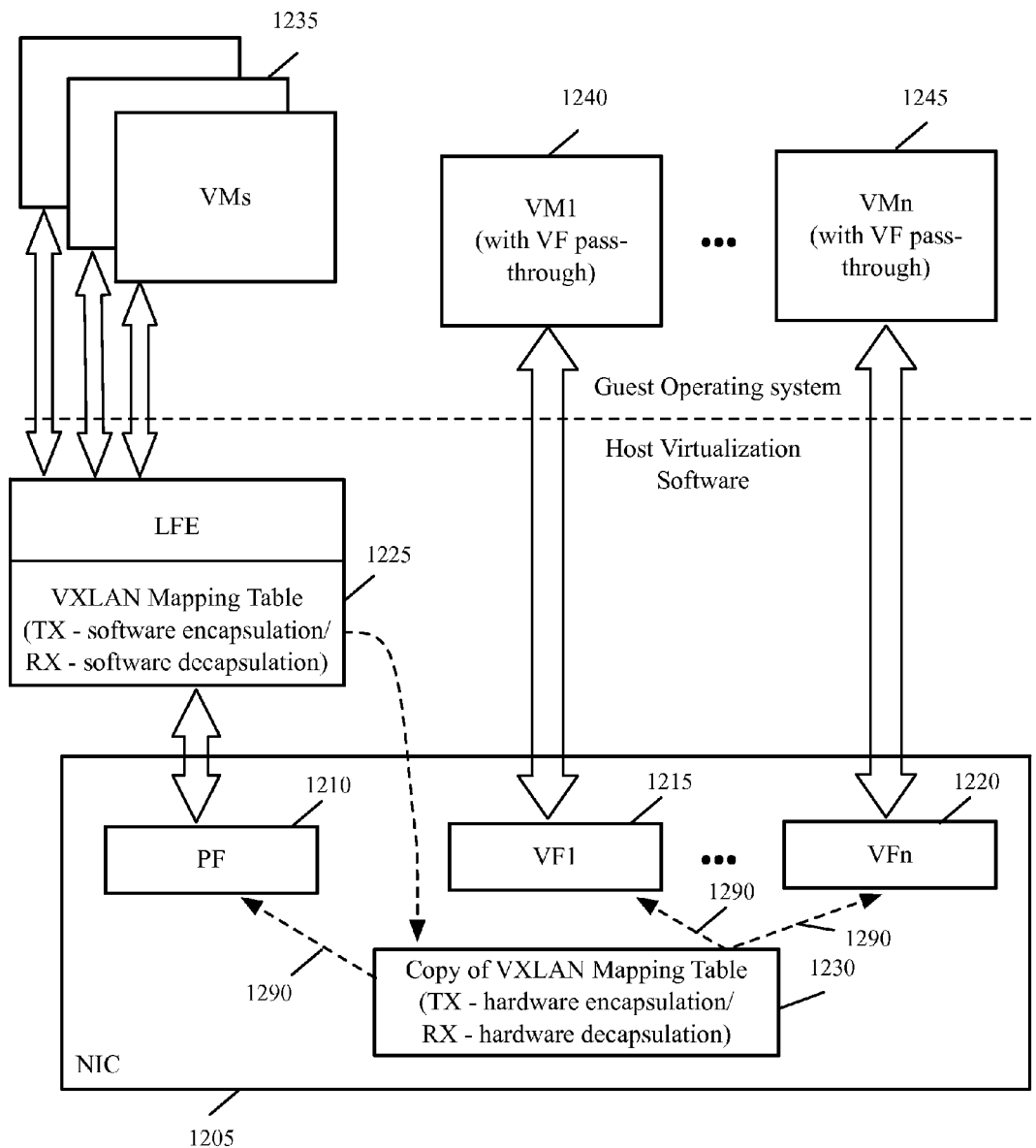
FIG. 12 conceptually illustrates the flow of VXLAN traffic in an SR-IOV environment in some embodiments of the invention.

FIG. 12 conceptually illustrates the flow of VXLAN traffic in an SR-IOV environment in some embodiments of the invention. As shown, the NIC 1205 has instantiated a PF 1210 and several VFs 1215-1220. The VXLAN software in the host virtualization software has sent a copy 1230 of the VXLAN address mapping table 1225 that is maintained by VXLAN software to the NIC 1205.

Each one of the VFs 1215-1220 is used to present itself as a separate instance of a NIC to a corresponding VM 1240-1245. In addition, the PF 1210 presents itself as a separate instance of a NIC to VMs 1235. Although FIG. 12 conceptually shows that VM 1240-1245 are not connected to the PF and VMs 1235 are not connected to any VFs, each VM 1235-1245. can be connected to either one VF, to the PF, or to the PF and one VF.

Since the NIC 1205 has a copy 1230 of the VXLAN mapping table, the NIC is capable of correctly encapsulate and decapsulate packets that are transmitted and received through the PF 1210 and each of VFs 1215-1220 to/from each VM 835-845. In some embodiments, the NIC provides the VXLAN mapping table 1230 to the PF and the VFs (as shown by the dashed lines 1290). For instance, the NIC stores copies of the table in memory regions that are accessible to individual VFs or the PF. In other embodiments, the NIC stores the table 1230 in a centralized memory region location that is accessible to all VFs and the PF.

When a VF is linked to a port set that is part of a VXLAN segment, the virtualization software pushes the VXLAN address mapping table to the VF by using the PF driver pass-through operation callback function handle (as described by reference to operation 910 in FIG. 9). This callback is used to program the VXLAN mapping information into the NIC hardware. The virtualization software also configures the VF with its VNI ID using the pass through operation call back provided by the PF driver (as described by reference to 915 in FIG. 9). For VFs to be part of VXLAN domain and active, the PF uplink in the virtualization software is linked to the same virtual switch where the VF's are placed.

Since VXLAN requires the packets to be encapsulated, the MTU on the LFE is configured to adjust the size of the packet to allow encapsulated frames to be sent out successfully. Some embodiments set the MTU on the LFE for the VF's part of a VXLAN segment. Any MTU change from the VF's VM goes through the PF driver pass-through callbacks and always ensures the MTU set in VM is 'n' bytes less than the configured MTU on LFE to accommodate the encapsulation needs, where 'n' the number of bytes required for the encapsulation headers. The actual verification of MTU in the virtualization software can choose to validate based on the encapsulation header requirements. Typically VF's MTU is 100 bytes (for GENEVE encapsulation needs to also include for optional headers) less than LFE MTU to accommodate the encapsulation.

2. Modifications to Transmit Data Path

The NIC in some embodiments encapsulates all the egress packets coming from a VF that is bounded to a VM. For SR-IOV VF's, the egress packets are received directly from the VMs at the NIC. The VMs do not tag the packets to indicate the packets require an overlay network encapsulation. Since there is no tag associated with the packets that arrive at the NIC through the VFs, all packets received at the NIC through a VF are encapsulated in the NIC using the mapping table if the VF is configured in the overlay network segment. On the other hand, the overlay network software in the hypervisor tags the packets that are sent by VMs through the PF to indicate that the hypervisor requires NIC to perform the encapsulation on the given packet before the NIC sends out on the wire.

If the source VTEP IP address and destination VTEP IP address are in the same network based on the source VTEP netmask, then NIC just encapsulates using the table entry. If the destination VTEP IP address is not in the same network as source VTEP IP address, then in some embodiments the NIC encapsulates the packet with gateway's MAC address as the outer destination MAC address (instead of using a mapping table entry). In other embodiments, the virtualization software updates the address mapping table with the gateway MAC address for the VTEP that is not in the source VTEP network and pushes the updated table to the NIC. In these embodiments, the NIC does not need to do anything as the NIC picks up the VTEP MAC address, which is already changed to gateway's MAC address in the mapping table. Once this lookup is successful, the NIC will encapsulate the inner packet with the newly constructed outer IP header (VTEP IP, VTEP MAC) and carry out rest of the operations such as hardware checksum and TSO and transmit the packet on the wire.

Figure 13:
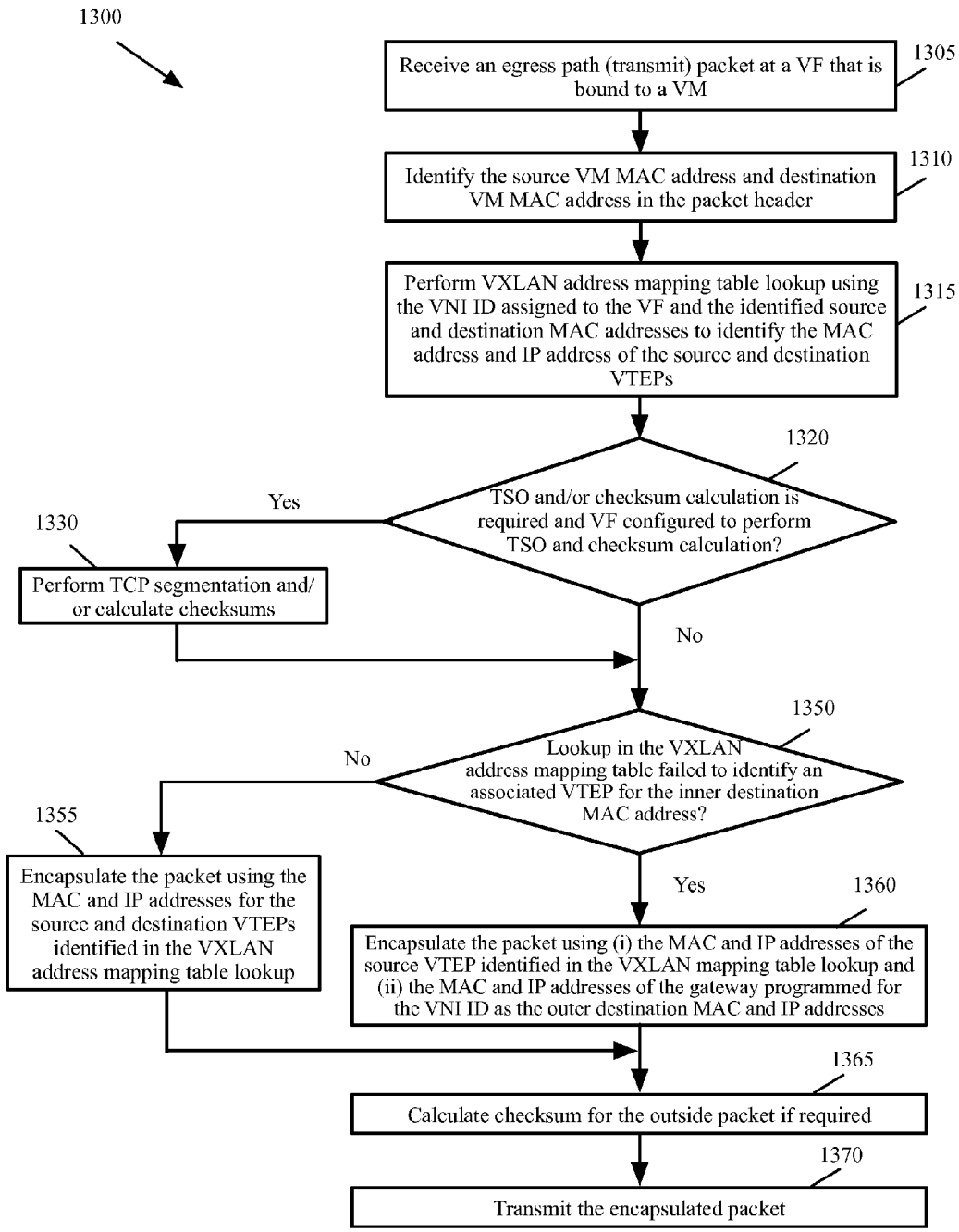
FIG. 13 conceptually illustrates the encapsulation process for the egress packets in some embodiments of the invention.

FIG. 13 conceptually illustrates the encapsulation process 1300 for the egress packets in some embodiments of the invention. As shown, the process receives (at 1305) an egress path (transmit) packet at a VF that is bounded to a VM. For instance, the VM has sent the packet to the VF (which appears as a NIC to the VM) to transmit. The process identifies (at 1310) the source VM MAC address and destination VM MAC address (e.g., items 215 and 210 in FIG. 2) in the packet header.

The process performs (at 1315) VXLAN address mapping table lookup using the VNI ID assigned to the VF and the identified source and destination MAC addresses in the packet header to identify the MAC address and IP address of the source and destination VTEPs.

The process then determines (at 1320) whether TSO and/or checksum calculation is required and the VF is configured to perform TSO and/or checksum offload. If not, the process proceeds to 1350, which is described below. Otherwise, the process performs (at 1330) TSP segmentation and/or checksum calculation.

The process then determines (at 1350) whether lookup in the VXLAN address mapping table has failed to identify an associated VTEP for the inner destination MAC address. If yes, the process proceeds to 1360, which is described below. Otherwise, the process encapsulates (at 1355) the packet using the MAC and IP addresses for the source and destination VTEPs identified in the VXLAN address mapping table lookup. The process then proceeds to 1365, which is described below.

When lookup in the VXLAN address mapping table fails to identify an associated VTEP for the inner destination MAC address, the process encapsulate (at 1360) the packet using (i) the MAC and IP addresses of the source VTEP identified in the VXLAN mapping table lookup and (ii) the MAC and IP addresses of the gateway programmed for the VNI ID as the outer destination MAC and IP addresses. The NIC in some embodiments generates an event for the virtualization software to indicate the lookup failure condition for the inner MAC address using the PF driver. The process then calculates (at 1365) checksum for the outside packet if required. The process then transmits (at 1370) the encapsulated packet. If the process performs TCP segmentation (at 1335), the process repeats operations 1340-1370 for each individual segmented TCP packet. Although the encapsulation is described by reference to the example of VXLAN, a person of ordinary skill in the art will realize that the encapsulation can be done over other overlay networks such as GENEVE, etc.

The NIC in some embodiments is configured to have access to information for all fields required for encapsulating a packet for transmission over an overlay network. For instance, the NIC in some embodiments constructs the UDP header (item 240 in FIG. 2) by using the source port. The NIC further calculates the UDP length based on the encapsulated packet.

3. Modifications to Receive Data Path

The physical NIC in some embodiments decapsulates (using the NIC hardware, firmware, and/or software) all the ingress packets received for the VF before sending the packets to the VM. The NIC decapsulates the ingress packet by stripping the outer headers (i.e., items 235-270 shown in FIG. 2).

Figure 14:
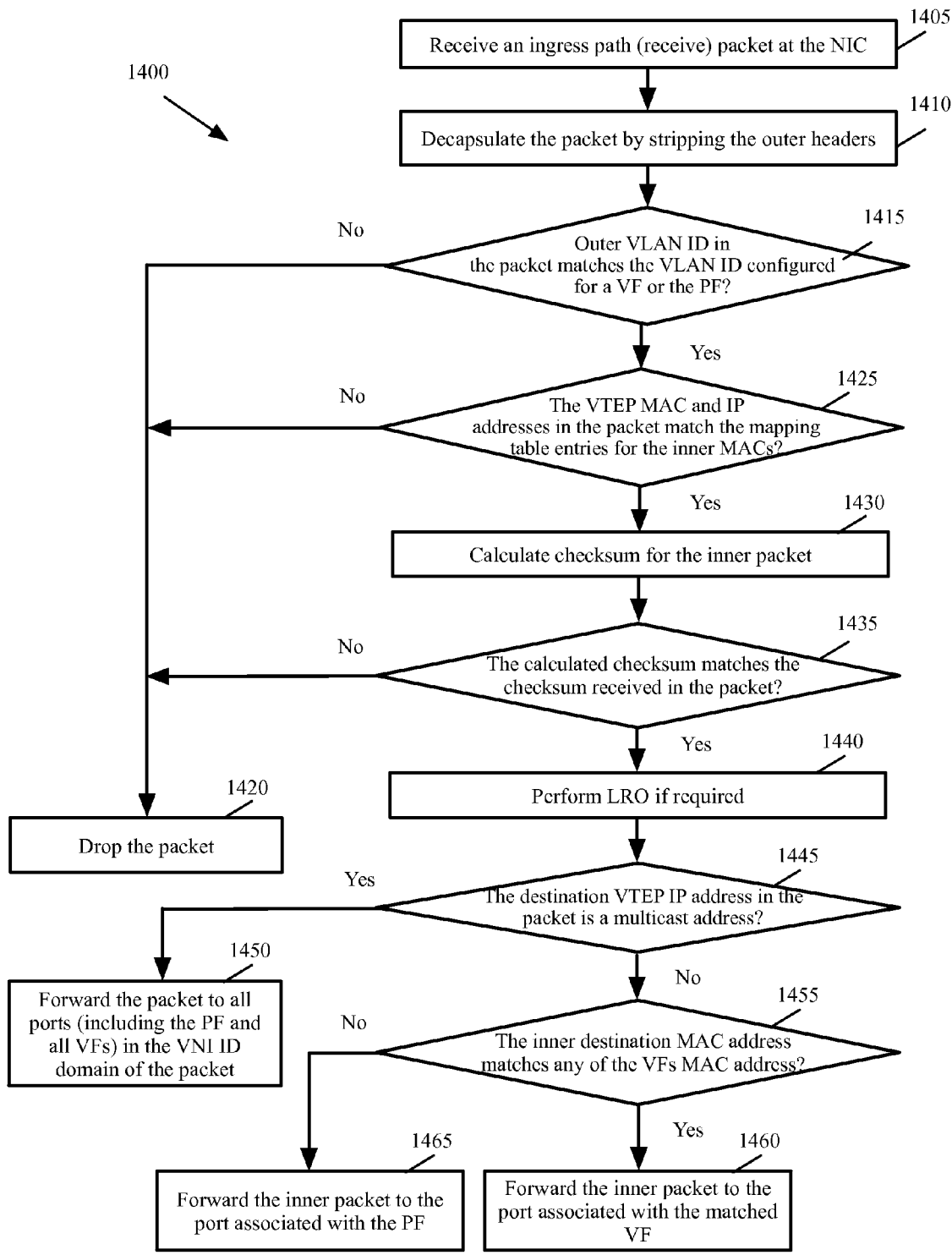
FIG. 14 conceptually illustrates the decapsulation process for the ingress packets in some embodiments of the invention.

FIG. 14 conceptually illustrates the decapsulation process 1400 for the ingress packets in some embodiments of the invention. As shown, the process receives (at 1405) an ingress path (receive) packet at the NIC. The process decapsulates (at 1410) the packet by stripping the outer headers (e.g., items 235-270 shown in FIG. 2).

The process then determines (at 1415) whether the outer VLAN ID in the packet matches the VLAN ID configured for a VF or the PF. If not, the process drops (at 1420) the packet. Otherwise, the process determines (at 1425) whether the source VTEP MAC and IP addresses in the packet match the mapping table entry for the inner source MAC address and the destination VTEP MAC and IP addresses in the packet match the mapping table entry for the inner destination MAC address. If not, the process proceeds to 1420, which was described above. Otherwise, the process calculates (at 1430) the checksum for the inner packet.

The process then determines (at 1435) whether the calculated checksum matches the checksum for the inner packet received in the packet. If not, the process proceeds to 1420, which was described above. Otherwise, the process performs (at 1440) LRO if required. The process then determines (at 1445) whether the destination VTEP IP address in the packet is a multicast address. In some embodiments, the multicast IP addresses fall in a predetermined range of IP addresses. When the destination VTEP IP address in the packet is a multicast, the process forwards (at 1450) the packet to all ports (including the PF and all VFs) in the VNI ID domain of the packet. Otherwise, the process determines (at 1455) whether the inner destination MAC address matches any of the VFs MAC address. If yes, the process forwards (at 1460) the inner packet to the port associated with the matched VF. Otherwise, the process forwards (at 1465) the inner packet to the port associated with the PF.

4. ARP Handling for VF in the NIC

The Address Resolution Protocol (ARP) requests originating from a VF's VM is encapsulated with the IP multicast address configured for VF's VNI-ID. The NIC sends out this encapsulated ARP frame. When the NIC receives an ARP response for one of its VF, the NIC validates the outer header with the VXLAN mapping table. The NIC performs the validation operations described below.

Figure 15:
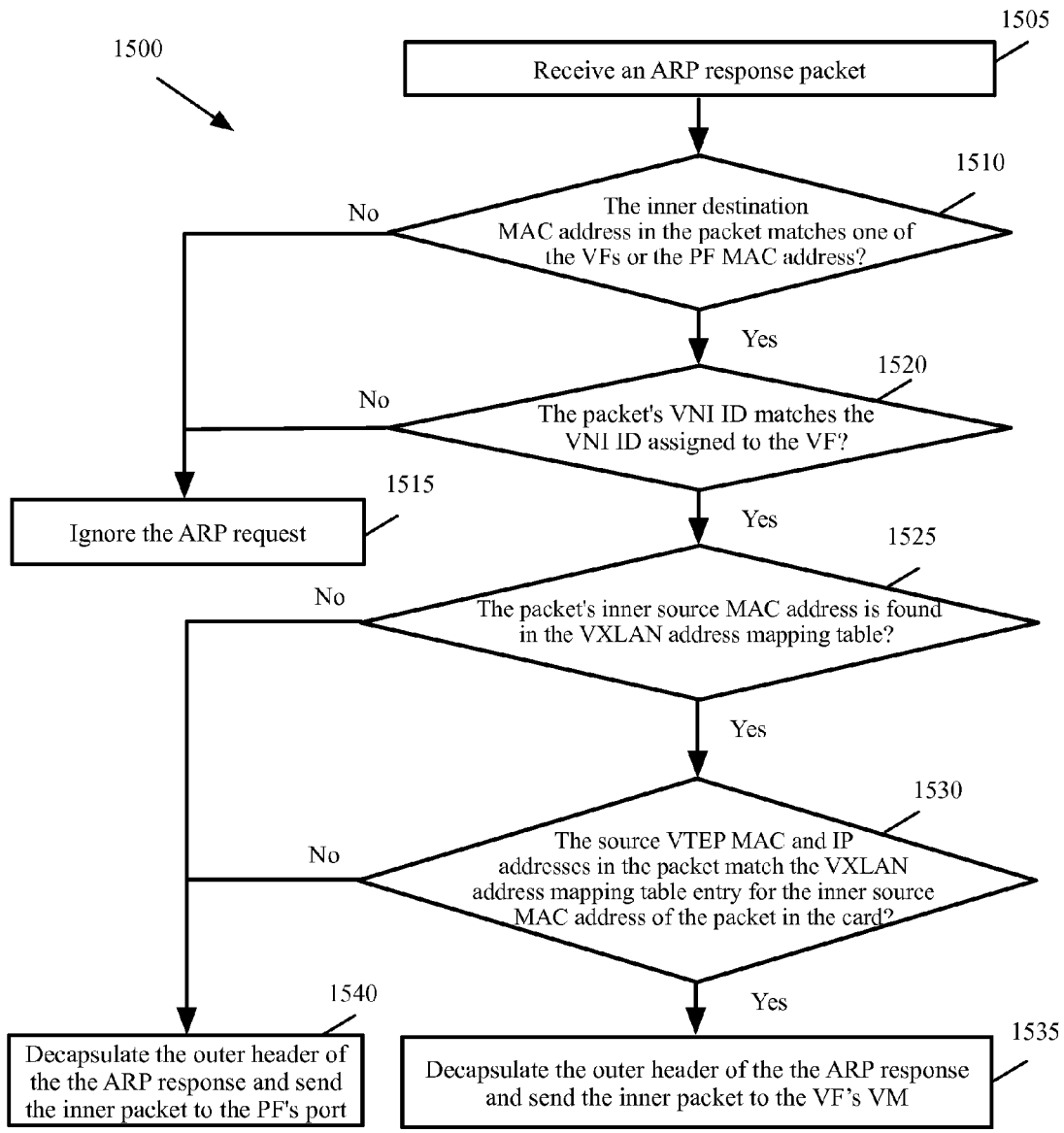
FIG. 15 conceptually illustrates a process for processing the ARP request from a VF in some embodiments of the invention.

FIG. 15 conceptually illustrates a process 1500 for processing the ARP response from a VF in some embodiments of the invention. As shown, the process receives (at 1405) an ARP response packet. The process determines (at 1510) whether the inner destination MAC address in the packet matches the MAC address of one of the VFs or the MAC address of the PF. If not, the process ignores (at 1515) the ARP request. Otherwise, the process determines (at 1520) whether the packet' VNI ID matches the VNI ID assigned to the VF or the PF that matched the inner destination MAC address in operation 1510.

If not, the process proceeds to 1515, which was described above. Otherwise, the process performs a VXLAN address mapping table lookup using the inner source MAC address in the packet to determine (at 1525) whether a match is found in the table. If not, the process proceeds to 1540, which is described below. Otherwise, the process determines (at 1530) whether the source VTEP MAC and IP addresses in the packet match the VXLAN address mapping table (i.e., the copy of the table in the NIC as described by reference to table 1230 in FIG. 12) entry for the inner source MAC address of the packet. If a valid entry is found, then the process decapsulates the outer header and sends (at 1535) the ARP response to the VF's VM.

Otherwise, if no valid entry found, then the process in some embodiments decapsulates the outer header and forwards (at 1540) the ARP response to the PF port and does not forward the packet to a VF's port. Instead, the PF sends the outer header information and the inner packet to the VXLAN software (through the PF driver in the virtualization software). The VXLAN software in the virtualization software learns the mapping for the VTEP location for the inner source MAC. Once this is learned, the virtualization software pushes the updated mapping table to the VF using pass-through operations for that VF. Since the ARP response is not sent to the VF's VM, the VM experiences an ARP timeout and retries the ARP request. The VF's VM should be configured for the ARP retries and ARP timeout. The subsequent ARP requests go out of the VF port encapsulated with IP multicast and when the NIC receives the ARP response, it finds a matching entry in its table and forward to the VF's VM.

In operation 1540, the VM could experience an ARP timeout and needs to retry ARP request. Some embodiments perform the followings instead of operation 1540 to avoid the ARP timeout. When there is no valid entry found in 1530, the NIC forwards the ARP response to the PF port and should not forward this packet to VF's port. The VXLAN software in the hypervisor will learn the mapping for the VTEP location for the inner source MAC address. Once this is learned, the virtualization software pushes the updated mapping table to the VF using pass-through operations for that VF. After the table is successfully set in the NIC with this entry included, the ARP Proxy (ARP agent in virtualization software) sends an ARP response to the VF's VM. The VF then performs operations 1510-1535.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 16:
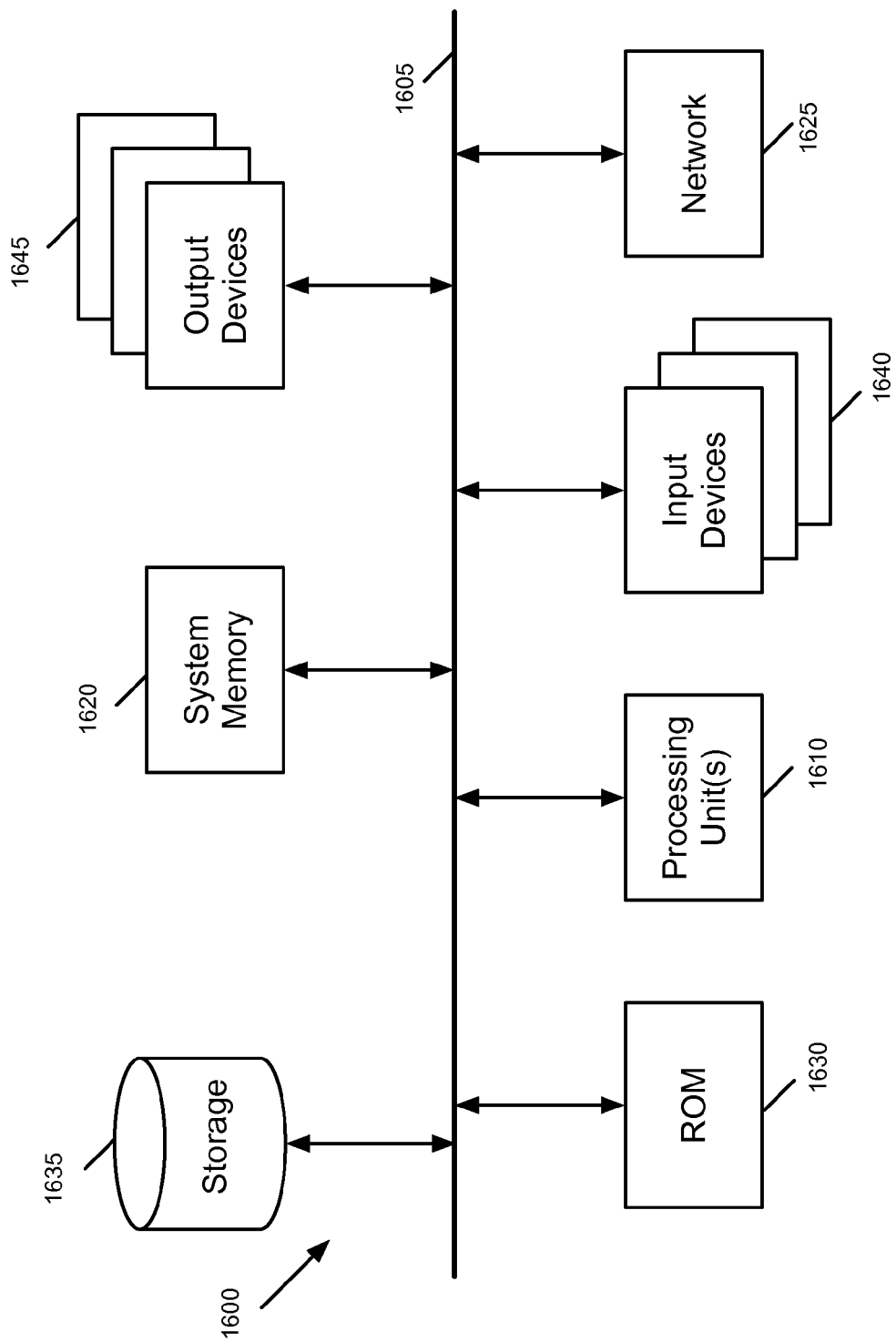
FIG. 16 conceptually illustrates an electronic system with which some embodiments of the invention are implemented.

FIG. 16 conceptually illustrates an electronic system 1600 with which some embodiments of the invention are implemented. The electronic system 1600 can be used to execute any of the control, virtualization, or operating system applications described above. The electronic system 1600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1600 includes a bus 1605, processing unit(s) 1610, a system memory 1620, a read-only memory (ROM) 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the system memory 1620, and the permanent storage device 1635.

From these various memory units, the processing unit(s) 1610 retrieve instructions to execute and data to process in order to execute the processes of the invention. The processing unit(s) may be a single processor or a multi-core processor in different embodiments.

The read-only-memory 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive) as the permanent storage device 1635.

Other embodiments use a removable storage device (such as a floppy disk, flash drive, etc.) as the permanent storage device. Like the permanent storage device 1635, the system memory 1620 is a read-and-write memory device. However, unlike storage device 1635, the system memory is a volatile read-and-write memory, such a random access memory. The system memory stores some of the instructions and data that the processor needs at runtime. In some embodiments, the invention's processes are stored in the system memory 1620, the permanent storage device 1635, and/or the read-only memory 1630. From these various memory units, the processing unit(s) 1610 retrieve instructions to execute and data to process in order to execute the processes of some embodiments.

The bus 1605 also connects to the input and output devices 1640 and 1645. The input devices enable the user to communicate information and select commands to the electronic system. The input devices 1640 include alphanumeric keyboards and pointing devices (also called "cursor control devices"). The output devices 1645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 16, bus 1605 also couples electronic system 1600 to a network 1625 through a network adapter (not shown). In this manner, the computer can be a part of a network of computers (such as a local area network ("LAN"), a wide area network ("WAN"), or an Intranet, or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 6-9 and 13-15) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

In view of the foregoing, one of ordinary skill in the art would understand that the invention is not to be limited by the foregoing illustrative details, but rather is to be defined by the appended claims.

What is claimed is:

1. A method for offloading packet encapsulation for an overlay network, the method comprising:

sending a mapping table of the overlay network from a host machine to a physical network interface controller (NIC) of the host machine, the mapping table associating each VM of a set of VMs of a tenant with an associated tunnel endpoint on the overlay network;

determining whether the overlay network encapsulation of a packet received at the host from a VM of the tenant is to be offloaded to the physical NIC;

when the encapsulation of the packet is to be offloaded to the physical NIC, tagging the received packet at the host for encapsulation by the physical NIC and sending the packet to the physical NIC without encapsulation, wherein when the packet is tagged, the physical NIC encapsulates the packet for the overlay network by using the mapping table to identify the tunnel endpoint based on an identifier of the VM; and when the encapsulation of the packet is not to be offloaded to the physical NIC, encapsulating the received packet at the host by using the mapping table to identify the tunnel endpoint associated with the VM based on the identifier of the VM and sending the encapsulated packet without a tag to the physical NIC.

2. The method of claim 1, wherein the host tags the packet to indicate that the packet requires encapsulation for transmission in the overlay network prior to sending the packet to the physical NIC.

3. The method of claim 1 further comprising:
updating the mapping table by the host after receiving a control event in a set of control events triggering the update of the mapping table; and
sending the updated mapping table to the physical NIC.

4. The method of claim 3, wherein the set of control events comprises a VM joining the overly network, a VM leaving the overlay network, a VM of the tenant migrating to the host machine from another host machine, a VM of the tenant migrating from the host machine to another host machine, and receiving incoming packets for the overlay network at the physical NIC from an entity outside of the host machine.

5. The method of claim 1, wherein the identification of the tunnel endpoint comprises an identification of an end of the tunnel terminating on the host machine, wherein the mapping table further associates the identification of each VM to an identification of the overlay network.

6. The method of claim 1 further comprising:
at the physical NIC, receiving a packet destined for one of the VMs of the tenant;
removing an outer layer of the received packet, the outer layer comprising information corresponding to the overlay network; and
sending the packet after removing the outer layer to the host.

7. The method of claim 6, wherein the packet comprises an identification of a source VM of the tenant sending the packet, an identification of an endpoint of the tunnel corresponding to the source VM, and an identification of the overlay network.

8. The method of claim 7 further comprising:
at the physical NIC, learning any changes to the mapping table based on the information received from the packet; and
sending the changes to the host.

9. The method of claim 8 further comprising updating the mapping table by the host based on the learned changes.

10. The method of claim 1, wherein the overlay network is a virtual extensible local area network (VXLAN).

11. A computing device serving as a host of virtual machines (VMs) comprising:
a physical network interface controller (NIC);
a set of processing units for executing instructions; and
a non-transitory computer readable storage medium storing sets of instructions for execution by the set of processing units, the sets of instructions for:
sending a mapping table of an overlay network to the NIC, the mapping table associating each VM of a set of VMs of a tenant on the host with an associated tunnel endpoint on the overlay network;
determining whether the overlay network encapsulation of a packet received at the host from a VM of the tenant is to be offloaded to the physical NIC;
when the encapsulation of the packet is to be offloaded to the physical NIC, tagging the received packet for encapsulation by the physical NIC and sending the packet to the physical NIC without encapsulation, wherein when the packet is tagged, the physical NIC encapsulates the packet for the overlay network by using the mapping table to identify the tunnel endpoint based on an identifier of the VM;
when the encapsulation of the packet is not to be offloaded to the physical NIC, encapsulating the received packet for the overlay network by using the mapping table to identify the tunnel endpoint associated with the VM based on the identifier of the VM and sending the encapsulated packet without a tag to the physical NIC to be transmitted.

12. The computing device of claim 11, the computer readable storage medium further storing a set of instructions for tagging the packet as a packet that requires encapsulation for transmission in the overlay network prior to sending the packet to the physical NIC.

13. The computing device of claim 11, the computer readable storage medium further storing a set of instructions for:
updating the mapping table after receiving a control event in a set of control events triggering the updating of the mapping table; and
sending the updated mapping table to the physical NIC.

14. The computing device of claim 13, wherein the set of control events comprises a VM joining the overly network, a VM leaving the overlay network, a VM of the tenant migrating to the host from another host, a VM of the tenant migrating from the host to another host, and receiving incoming packets for the overlay network at the physical NIC from an entity outside of the host.

15. The computing device of claim 11, wherein the identification of the tunnel comprises an identification of an end of the tunnel terminating on the host, wherein the mapping table further associates the identification of each VM to an identification of the overlay network.

16. The computing device of claim 11, the physical NIC further configured to:
receive a packet destined for one of the VMs of the tenant;
remove an outer layer of the received packet, the outer layer comprising information corresponding to the overlay network; and
send the packet after removing the outer layer to the set of processing units.

17. The computing device of claim 16, wherein the packet comprises an identification of a source VM of the tenant sending the packet, an identification of an end of the tunnel corresponding to the source VM, and an identification of the overlay network.

18. The computing device of claim 17, the physical NIC further configured to:
learn any changes to the mapping table based on the information received from the packet; and
send the changes to the set of processing units.

19. The computing device of claim 18, the computer readable storage medium further storing a set of instructions for updating the mapping table based on the learned changes.

20. The computing device of claim 11 further comprising a storage for storing the mapping table.

* * * * *